(12) United States Patent
McKenna et al.

(10) Patent No.: US 11,656,420 B2
(45) Date of Patent: May 23, 2023

(54) SYSTEM AND METHOD OF DISTRIBUTING ULTRA HIGH POWER USING OPTICAL FIBER CABLE

(71) Applicant: Macleon, LLC, Mobile, AL (US)

(72) Inventors: Edward McKenna, Sebastopol, CA (US); Gerald Leon Wallace, Jr., Mobile, AL (US)

(73) Assignee: Macleon, LLC, Mobile, AL (US)

( * ) Notice: Subject to any disclaimer, the term of this patent is extended or adjusted under 35 U.S.C. 154(b) by 0 days.

(21) Appl. No.: 17/581,894

(22) Filed: Jan. 22, 2022

(65) Prior Publication Data

US 2022/0236490 A1 Jul. 28, 2022

Related U.S. Application Data

(60) Provisional application No. 63/266,144, filed on Dec. 29, 2021, provisional application No. 63/140,736, filed on Jan. 22, 2021.

(51) Int. Cl.
*G02B 6/44* (2006.01)
*G02B 6/02* (2006.01)
(Continued)

(52) U.S. Cl.
CPC ....... *G02B 6/4436* (2013.01); *G02B 6/02395* (2013.01); *G02B 6/4401* (2013.01);
(Continued)

(58) Field of Classification Search
None
See application file for complete search history.

(56) References Cited

U.S. PATENT DOCUMENTS

| | | |
|---|---|---|
| 4,098,445 A | 7/1978 | Samokovliski et al. |
| 4,654,065 A | 3/1987 | Naumann et al. |

(Continued)

FOREIGN PATENT DOCUMENTS

| | | |
|---|---|---|
| CN | 101442079 A | 5/2009 |
| CN | 103825164 A | 5/2014 |

(Continued)

OTHER PUBLICATIONS

International Search Report and Written Opinion for International Application No. PCT/US2022/013432, dated Jun. 14, 2022, 13 pages.

*Primary Examiner* — Andrew Jordan
(74) *Attorney, Agent, or Firm* — Neal, Gerber & Eisenberg LLP

(57) ABSTRACT

Embodiments include an optical fiber cable comprising a length extending between a first end and a second end, a central cooling tube, a plurality of optical fibers disposed radially around the cooling tube, each optical fiber comprising a fiber core and a cladding disposed around the fiber core, an outer protective cover, and an inner thermal filler disposed between the outer protective cover and the central cooling tube and surrounding each of the optical fibers, wherein each of the central cooling tube, the outer protective cover, the inner thermal filler, and the plurality of optical fibers extend the length of the cable. Various systems and methods for removing imperfections from individual optical fibers and for distributing power across long distances using the optical fiber cable are also provided.

21 Claims, 15 Drawing Sheets

(51) Int. Cl.

| | |
|---|---|
| *C03B 37/07* | (2006.01) |
| *C03B 37/10* | (2006.01) |
| *H04B 10/80* | (2013.01) |
| *G02B 6/38* | (2006.01) |
| *G02B 6/42* | (2006.01) |

(52) U.S. Cl.
CPC .............. *C03B 37/07* (2013.01); *C03B 37/10* (2013.01); *G02B 6/3814* (2013.01); *G02B 6/3885* (2013.01); *G02B 6/4268* (2013.01); *G02B 6/4439* (2013.01); *H04B 10/806* (2013.01)

(56) References Cited

U.S. PATENT DOCUMENTS

| | | | |
|---|---|---|---|
| 4,840,453 A * | 6/1989 | Kitayama | G02B 6/4407 385/104 |
| 5,355,427 A | 10/1994 | Gareis et al. | |
| 5,642,454 A | 6/1997 | Kopylov et al. | |
| 5,991,486 A | 11/1999 | Braglia | |
| 6,324,742 B1 | 12/2001 | Odanaka | |
| 7,013,678 B2 | 3/2006 | DiGiovanni et al. | |
| 7,813,646 B2 | 10/2010 | Furey | |
| 8,472,764 B2 | 6/2013 | Chan et al. | |
| 8,571,368 B2 | 10/2013 | Rinzler et al. | |
| 8,742,251 B2 | 6/2014 | Werthen et al. | |
| 9,088,074 B2 | 7/2015 | Heiks et al. | |
| 9,169,814 B2 | 10/2015 | Mcalister | |
| 9,285,535 B2 | 3/2016 | Jain et al. | |
| 9,306,364 B2 | 4/2016 | Gapontsev et al. | |
| 9,340,445 B2 | 5/2016 | Glover et al. | |
| 9,533,915 B2 | 1/2017 | Johnson et al. | |
| 9,595,802 B2 | 3/2017 | Fermann et al. | |
| 9,734,940 B1 | 8/2017 | Mcnutt et al. | |
| 10,001,612 B2 | 6/2018 | Zediker et al. | |
| 10,442,721 B1 | 10/2019 | Tucker et al. | |
| 10,550,028 B2 | 2/2020 | Starodubov et al. | |
| 10,705,297 B2 | 7/2020 | Stone et al. | |
| 10,902,977 B2 | 1/2021 | Cantz et al. | |
| 2003/0161596 A1 | 8/2003 | Register et al. | |
| 2005/0286847 A1 | 12/2005 | Arimondi et al. | |
| 2006/0188259 A1 | 8/2006 | Furey | |
| 2009/0016715 A1 * | 1/2009 | Furey | H04B 10/807 398/38 |
| 2014/0186045 A1 | 7/2014 | Poddar et al. | |
| 2015/0117473 A1 | 4/2015 | Rockwell et al. | |
| 2015/0177732 A1 | 6/2015 | Rochette et al. | |
| 2016/0072248 A1 | 3/2016 | Johnson et al. | |
| 2018/0039155 A1 | 2/2018 | Thomsen | |
| 2018/0154129 A1 | 6/2018 | Paul et al. | |
| 2019/0031552 A1 | 1/2019 | Clawson et al. | |
| 2020/0095157 A1 | 3/2020 | Clawson et al. | |
| 2020/0232610 A1 | 7/2020 | Raring et al. | |
| 2022/0236490 A1* | 7/2022 | McKenna | G02B 6/4436 |

FOREIGN PATENT DOCUMENTS

| | | |
|---|---|---|
| CN | 204305024 U | 4/2015 |
| CN | 104345412 B | 7/2016 |
| CN | 106226603 A | 12/2016 |
| CN | 205958653 U | 2/2017 |
| CN | 104092496 B | 4/2017 |
| CN | 216487468 U | 5/2022 |
| JP | H05294662 A | 11/1993 |
| WO | 2005027300 A1 | 3/2005 |
| WO | 2006088566 A2 | 8/2006 |
| WO | 2021030281 A1 | 2/2021 |

* cited by examiner

SYSTEM AND METHOD OF DISTRIBUTING ULTRA HIGH POWER USING OPTICAL FIBER CABLE

CROSS-REFERENCE

This application claims priority to U.S. Provisional Application No. 63/140,736, filed on Jan. 22, 2021, and to U.S. Provisional Application No. 63/266,144, filed on Dec. 29, 2021, the contents of each being incorporated herein by reference in its entirety.

TECHNICAL FIELD

This disclosure generally relates to optical fiber and more specifically, to optical fiber cables, systems for distributing power using optical fiber cables or otherwise using said cables, and techniques for refining the optical fibers included in such cables.

BACKGROUND

Optical fiber cables can be used to transmit power from a power source to a remote endpoint. The term "power over fiber" typically refers to systems in which power generated by an electric power source is converted into optical power using a laser source, which is then transported over an optical fiber cable to an optical detector that converts the optical power back to electrical power and supplies the electrical power to an electric load. As an example, a typical power over fiber system contains a laser diode, a multimode optical fiber made of silica fiber, and a photovoltaic cell or other semiconductor device comprised of materials such as gallium arsenide (GaAs), indium phosphide (InP), or indium gallium arsenide (InGaAs).

Power over fiber systems offer several advantages over typical electrical power systems including, for example, little to no risk of electrical interference, service interruptions due to lightning, and explosions ignited by an electric spark. In addition, optical fiber cables have significantly higher power densities, can tolerate higher temperatures, and are far lighter than electrical cables. Moreover, unlike electrical wires, the same optical fiber may be used to transmit optical power one way and send data back the other way, for example, using a different wavelength or channel.

However, conventional power over fiber systems utilizing silica-based fiber suffer transmission and distribution losses, conversion efficiencies at both the transmit end (i.e. optical to electrical) and the receive end (i.e. optical to electrical), and large amounts of attenuation in the transport medium itself, thus limiting the broader applicability of such systems. For example, transmission of high power across large distances (e.g., 800 kilometers (km) overhead or 50 km undersea) is typically achieved using high voltage direct current (HVDC) electric power transmission systems (also known as a power or electrical superhighway) that use copper or aluminum cables, instead of silica-based fiber. Even still, the conversion efficiency from alternating current (AC) to HVDC may be as low as 60%, and some existing subsea systems experience a total power loss of 65% or more.

Another known type of fiber is zirconium fluoride-barium fluoride-lanthanum fluoride-aluminum fluoride-sodium fluoride ($ZrF_4$—$BaF_2$—$LaF_3$—$AlF_3$—$NaF$), otherwise known as "ZBLAN" fiber. ZBLAN is a type of fluoride glass that has superior infrared transmissibility and a significantly lower loss profile than standard silica. For example, as shown in FIG. 1, at 1550 nanometers (nm), standard silica fiber has a minimum loss of approximately 0.25 dB/km, while ZBLAN fiber has a theoretical loss limit of approximately 0.0001 dB/km, which is three orders of magnitude lower. However, this loss limit is difficult to achieve because ZBLAN often contains undesired impurities or crystallites that are formed during the manufacturing process and can inhibit the material's transmissibility.

More specifically, as shown in FIG. 2, ZBLAN has a relatively small temperature difference between the temperature at which ZBLAN fiber transitions from solid glass to a liquid or viscose state (i.e. the glass transition temperature $T_g$) and the temperature at which crystallization occurs (i.e. the crystallization temperature $T_x$). This provides a narrow working range for ZBLAN, thus allowing crystallites to form relatively easily during the drawing process. It has been shown that the crystallites can be suppressed or reduced by growing ZBLAN in zero or micro gravity (i.e. in outer space), rather than unit gravity (i.e. on Earth), due to a reduction in convective processes when in micro gravity conditions. However, conventional techniques for manufacturing ZBLAN in micro gravity conditions are extremely costly, time consuming, and/or difficult to implement on a large scale, for example, because they require space travel or the use of old mining shafts on Earth.

Accordingly, there is still a need in the art for an optical fiber cable and overall power over fiber system capable of efficiently transporting ultra high power across great distances with significantly low loss.

SUMMARY

The invention is intended to solve the above-noted and other problems through systems, methods, and apparatus configured to provide: (1) an optical fiber cable comprising a plurality of individual ZBLAN fibers capable of transmitting ultra high power laser energy over great distances with substantially low loss; (2) techniques for removing imperfections from said optical fibers that include annealing the fiber in a microgravity environment created on Earth; and (3) a power over fiber system comprising the optical fiber cable, an ultra-high power laser source coupled to a first end of the optical fiber cable, and a photodiode detector coupled to a second end of the optical fiber cable.

One exemplary embodiment provides a power over fiber system, comprising: a laser source configured to emit high power laser energy; an optical detector configured to convert detected light into electrical energy; and an optical fiber cable comprising: a first end coupled to the laser source, an opposing second end coupled to the optical detector, a length extending between the first and second ends, and a plurality of optical fibers, each optical fiber extending the length of the cable, and having a thermal filler surrounding the fiber.

Another exemplary embodiment provides a method of managing power delivery in a power over fiber system comprising a transmit unit having a laser source, a receive unit having an optical detector, and an optical fiber cable coupled between the units and comprising a plurality of optical fibers, each fiber extending the length of the optical fiber cable, the method comprising: transmitting high power laser energy from the transmit unit to the receive unit using a number of the optical fibers included in the optical fiber cable; receiving, at a processor, a data signal comprising information pertaining to a power requirement of an electric load coupled to the receive unit, the data signal being transmitted from the receive unit to the transmit unit using the optical fiber cable; and controlling, using the processor, the high power laser energy output by the transmit unit by adjusting the number of optical fibers used to transmit the laser energy based on the power requirement of the electric load.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the drawings identified below. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
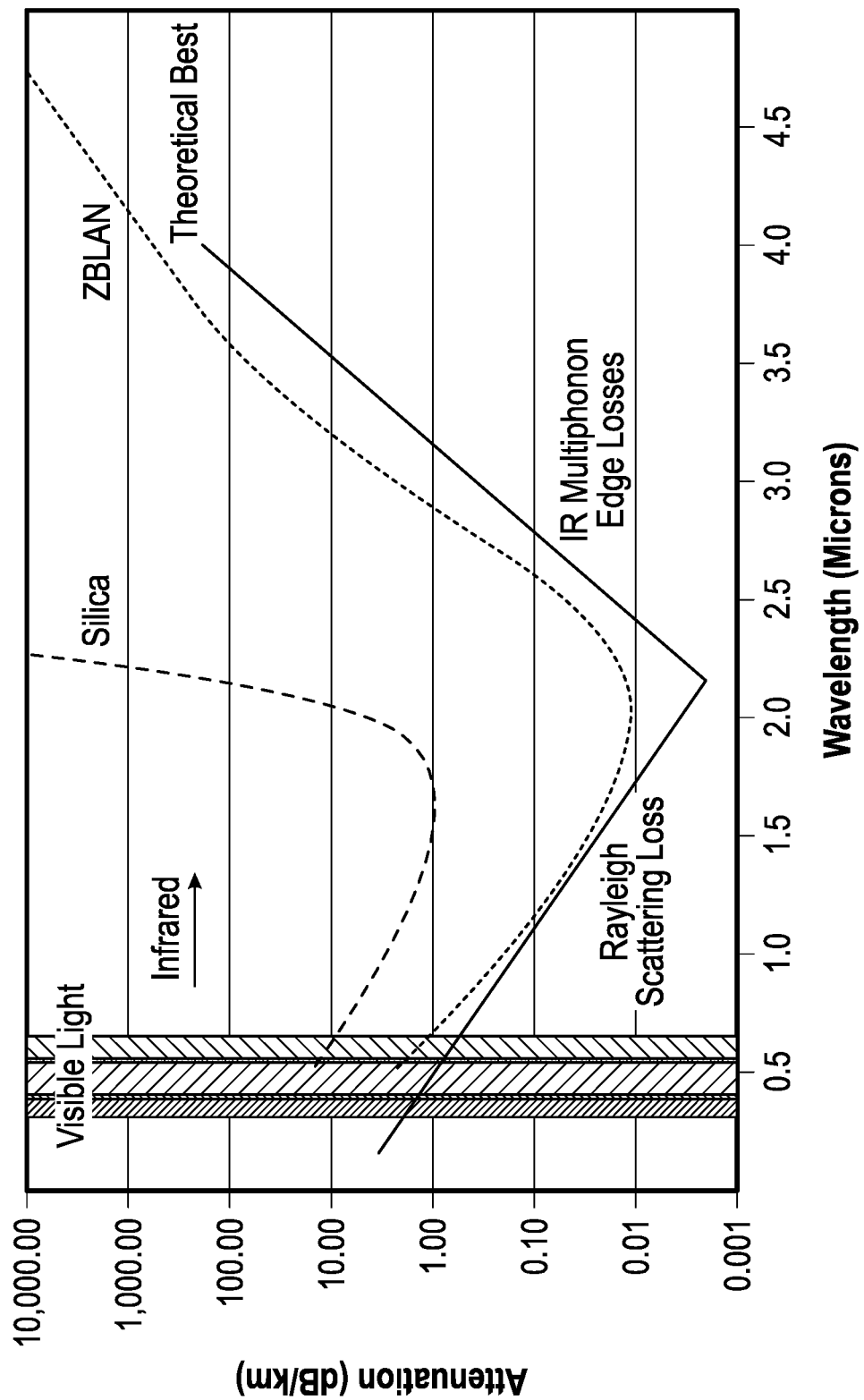
FIG. 1 is a graph illustrating known predicted loss profiles for silica and ZBLAN.
Figure 2:
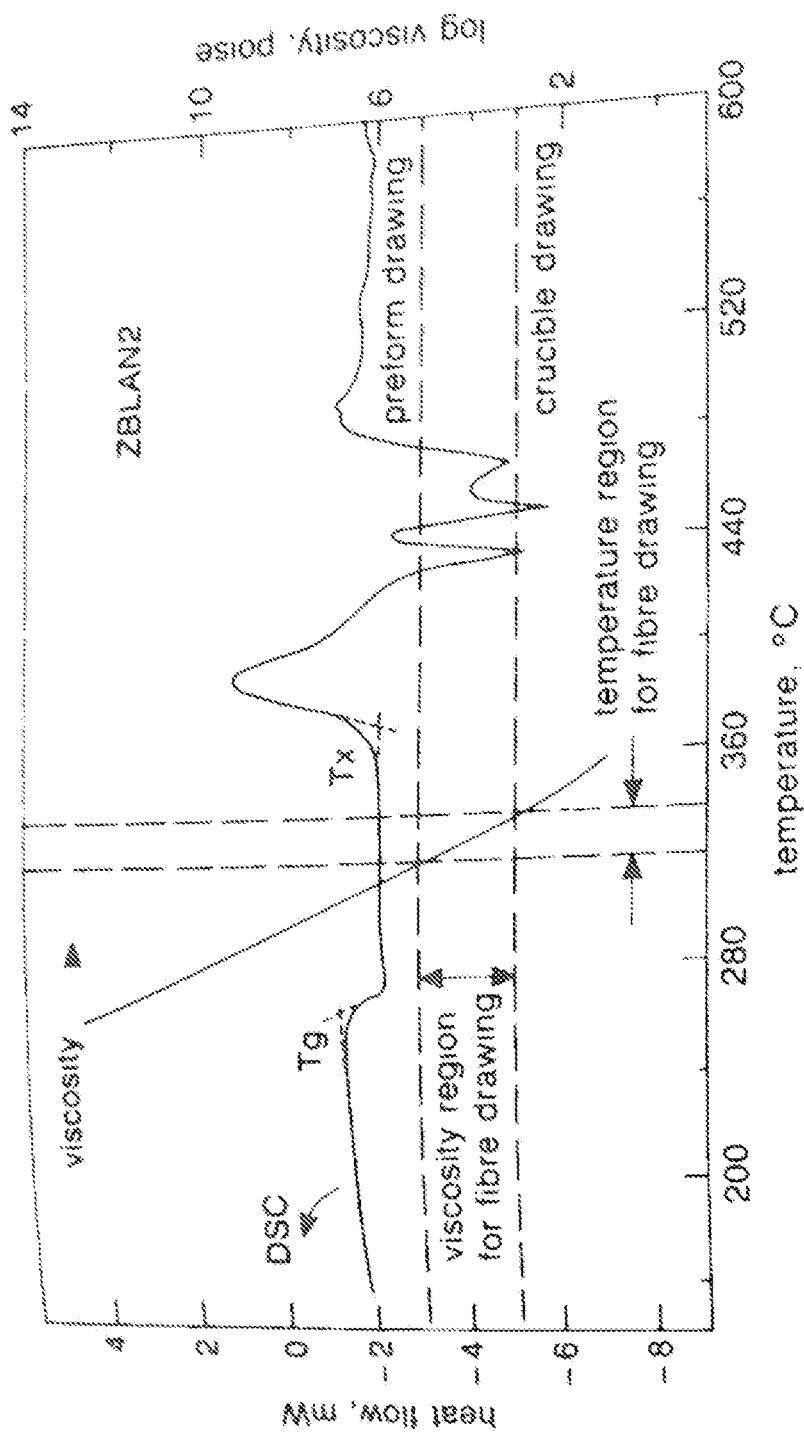
FIG. 2 is a graph illustrating known differential scanning calorimeter (DSC) results for showing crystallization and glass transition temperatures for ZBLAN.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

In the following description, elements, circuits and functions may be shown in block diagram form in order to not obscure the present disclosure in unnecessary detail. Additionally, block definitions and partitioning of logic between various blocks is exemplary of a specific embodiment. Further, those of ordinary skill in the art will understand that information and signals as depicted in the block diagrams may be represented using any variety of different technologies or techniques. For example, data, instructions, signals or commends may be represented in the figures, and which also would be understood as representing voltages, currents, electromagnetic waves or magnetic or optical fields, or combinations thereof. Additionally, some drawings may represent signals as a single signal for clarity of the description; and persons skilled in the art would recognize that the signal may represent a bus of signals. Various illustrative logic blocks, modules and circuits described in connection with embodiments disclosed herein may be implemented or performed with one or more processors. As would be appreciated and understood by persons of ordinary skill in the art, disclosure of separate processors in block diagrams may indicate a plurality of processors performing the functions or logic sequence disclosed herein, or may represent multiple functions or sequence performed on a single processor.

Systems, methods, and apparatus described herein provide techniques for refining ZBLAN fiber and providing an optical fiber cable comprised of multiple strands of modified ZBLAN fiber, the cable capable of transporting very large amounts of power over very large distances with substantially low loss. Also provided is a power over fiber system that utilizes the optical fiber cable as a transport medium between an optical source included in an electrical to optical conversion unit and an optical detector included in an optical to electrical conversion unit.

Various applications for the power over fiber system are contemplated, including optical power distribution systems and medical or surgical applications. Embodiments include an optical power distribution system that uses the optical fiber cable as an interconnector for transporting ultra high capacity optical power between continents under subsea or submarine conditions (e.g., enough to power a small country). For example, the optical power distribution system may be capable of distributing up to 1 gigawatt of power across distances as great as 1000 km at sea level, or 50 km subsea. Other embodiments provide optical power distribution systems that use the optical fiber cable to distribute power over an electrical grid between distribution stations, to power cellular towers in residential and commercial settings, in power over ethernet (POE) applications, and/or to distribute power in various automotive and aerospace applications.

Figure 3:
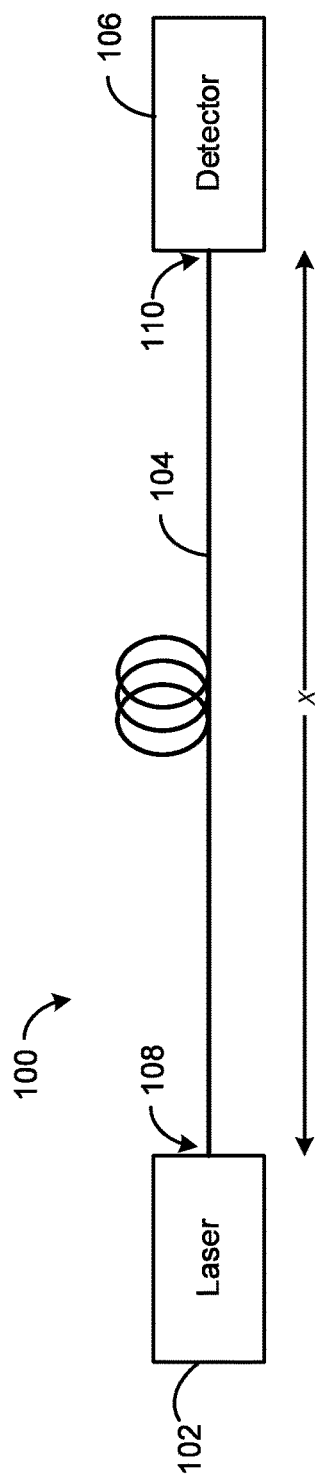
FIG. 3 is a functional block diagram illustrating an exemplary power over fiber system comprising the optical fiber cable of FIG. 3, in accordance with certain embodiments.
Figure 13:
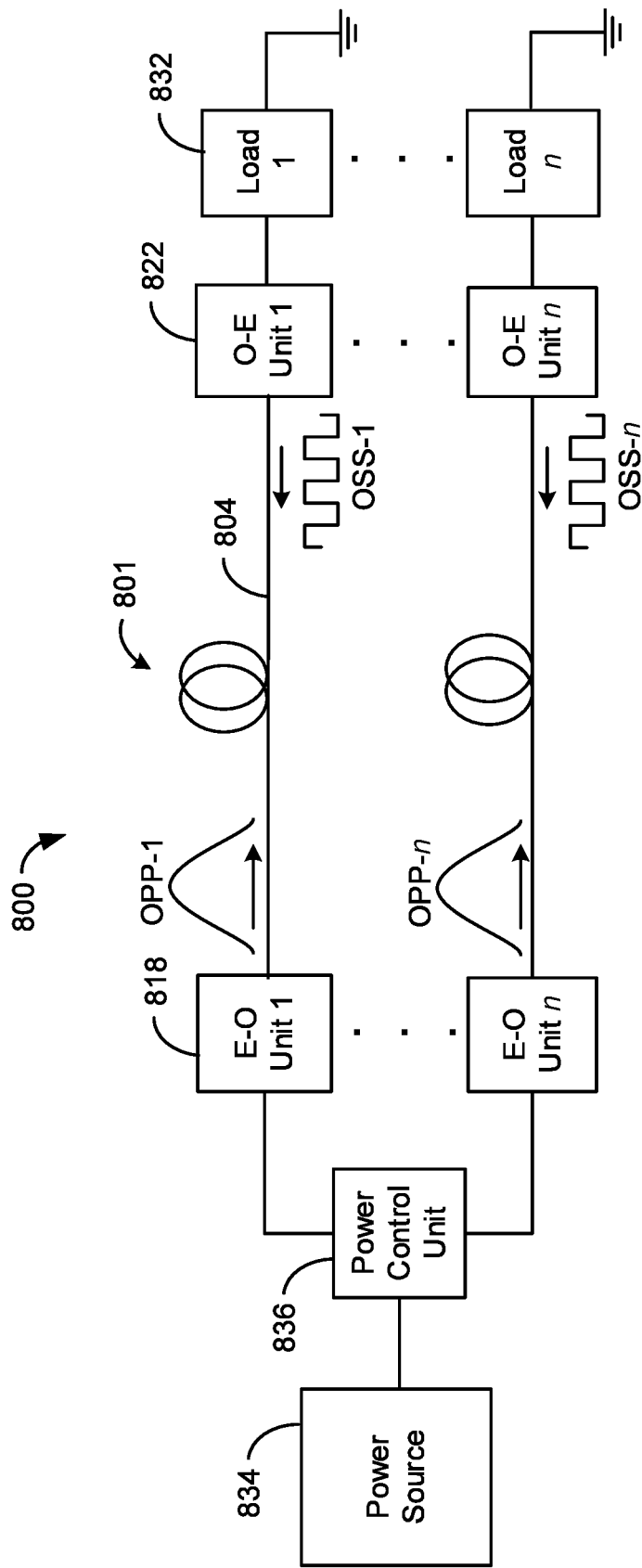
FIG. 13 is a functional block diagram of an exemplary optical power distribution system, in accordance with certain embodiments.
Figure 15:
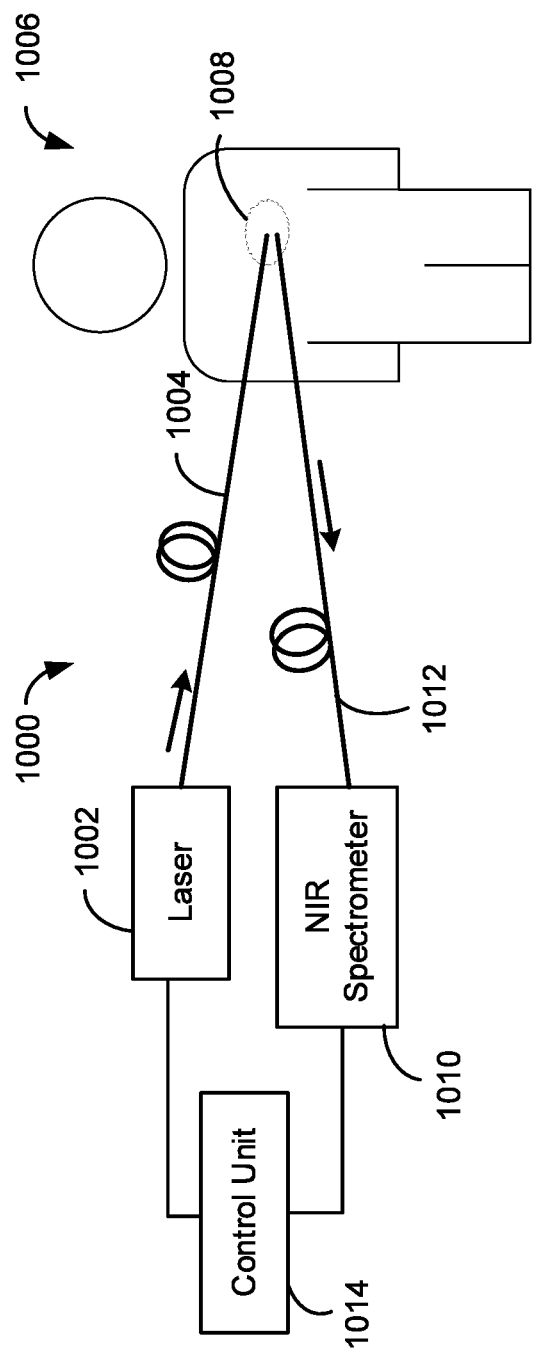
FIG. 15 is a functional block diagram of another exemplary power over fiber system configured for medical applications, in accordance with certain embodiments.

FIG. 3 illustrates an exemplary power over fiber system 100 comprising an optical source 102, an optical fiber cable 104, and an optical detector 106, in accordance with embodiments. As shown, the optical fiber cable 104 comprises a first end 108 coupled to the optical source 102, an opposing second end 110 coupled to the optical detector 106, and a length, x, extending between the first and second ends. In embodiments, each of the optical source 102, the optical fiber cable 104, and the optical detector 106 can be optimally configured to maximize conversion efficiencies, maximize power transport distances, and minimize insertion losses. The power over fiber system 100 may be used in various applications requiring the transport of optical power between two locations, such as, for example, a power distribution system, (e.g., as shown in FIG. 13) for commercial, residential, or other uses, a surgical apparatus (e.g., as shown in FIG. 15), and others.

Figure 12:
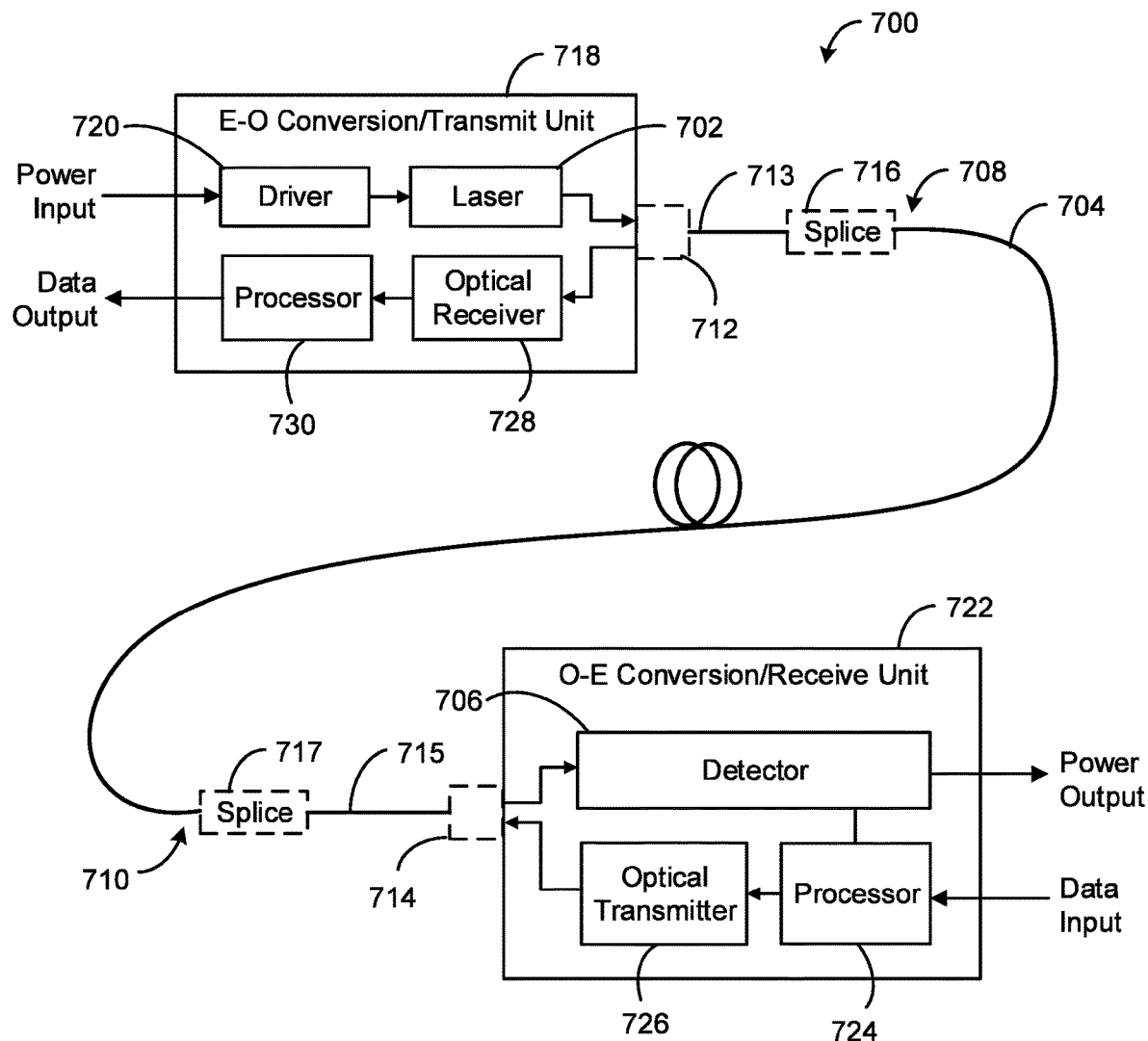
FIG. 12 is a functional block diagram of another exemplary power over fiber system, in accordance with certain embodiments.

The optical source 102 comprises one or more laser diodes or other semiconductor devices capable of converting electrical energy into optical energy and emitting the optical energy. In some embodiments, the optical source 102 is part of a larger electrical to optical conversion unit, for example, as shown in FIG. 12. In preferred embodiments, the optical source 102 is a highly efficient laser source capable of emitting ultra high power laser energy with ultra-low threshold current. As an example, the optical source 102 (also referred to herein as a "laser source") can include one or more high power laser diode bars (e.g., a GaInAsSb/AlGaAsSb diode) operating at an approximate wavelength of 2.1 microns (µm). As another example, the laser diode in the optical source 102 may be a multi-emitter multimode laser diode with a wavelength of approximately 980 nanometer (nm) and an output power of approximately 420 watts (W), or any other appropriate laser diode. In one embodiment, the optical source 102 has a conversion efficiency of at least about 85 percent and peak power delivery per link of at least about 1 gigawatt (GW). In some embodiments, the optical source 702 comprises a plurality of laser diodes arranged in an array (e.g., a diode array). In such cases, each diode may be individually controllable (e.g., turned on or off) in order alter or control a total output power of the optical source 102. The optical source 102 may further include one or more monitor diodes configured to stabilize an output of the optical source 102 (e.g., prevent fluctuations in laser energy). In some embodiments, the monitor diode of the optical source 102 is further configured to monitor signals received at the optical source 102 from the optical detector 106 (e.g., optical data signals) and provide the signals to a processor (e.g., processor 730 of FIG. 7).

The optical detector 106 comprises a photodiode, a photovoltaic cell, or other semiconductor device capable of detecting laser light or other optical energy and converting the detected light into electrical energy. In some embodiments, the optical detector 106 is part of a larger optical to electrical conversion unit, for example, as shown in FIG. 12. In preferred embodiments, the optical detector 106 comprises one or more highly efficient photodiode detectors (e.g., Four-Junction InGaAs). In one embodiment, the optical detector 106 has a conversion efficiency of at least about 85 percent, a peak power delivery per link of at least about 1 gigawatt (GW), and has a continuous power transmission of approximately one watt (W).

The optical fiber cable 104 serves as a transport medium for carrying optical power from the optical source 102 to the optical detector 106. The optical fiber cable 104 may also be configured to transport data signals, in addition to optical power, for example, as shown in FIG. 13. In preferred embodiments, the optical fiber cable 104 is a ultra high power cable comprising a plurality of optical fibers bundled together with a cooled center and a thermal acrylic filler surrounding each optical fiber, each fiber extending the length of the cable and comprising $ZrF_4$—$BaF_2$—$LaF_3$—$AlF_3$—$NaF$ (ZBLAN). In one embodiment, the optical fiber cable 104 is capable of transmitting laser energy having a power of at least about one gigawatt (GW) over a distance of at least about 1000 kilometers (km) with a loss of about 0.1 decibels (dB) and a power density of 0.4 $GW/cm^2$.

Figure 4:
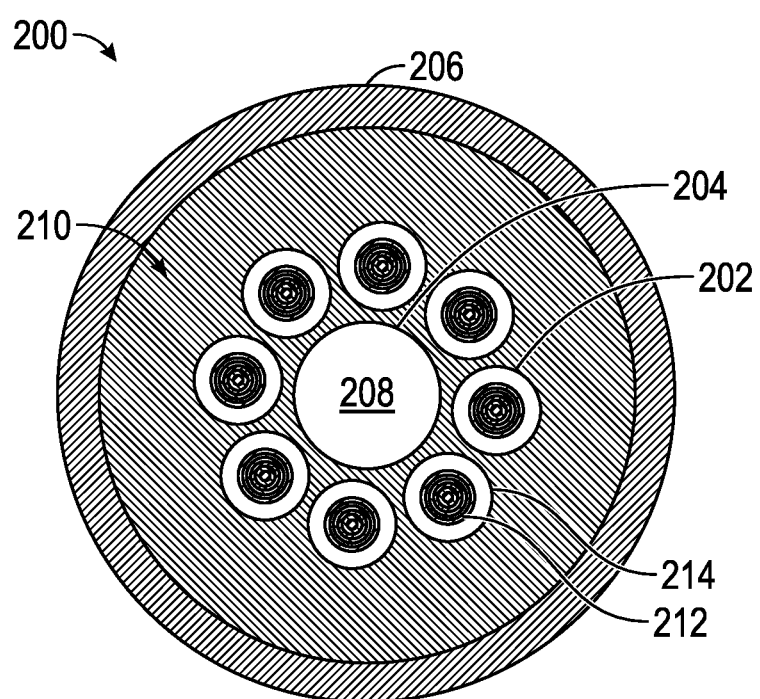
FIG. 4 is a schematic diagram illustrating a cross-sectional view of an exemplary optical fiber cable, in accordance with certain embodiments.

FIG. 4 illustrates a cross-sectional view of an exemplary optical fiber cable 200, in accordance with embodiments. The optical fiber cable 200 can be included in the power over fiber system 100 as the optical fiber cable 104, or in any of the other systems described herein. In other embodiments, the optical fiber cable 200 can be configured to transport communication signals over large distances, instead of optical power.

As shown, the optical fiber cable 200 comprises a plurality of optical fibers 202 disposed radially around a central cooling tube 204 and encased by an outer protective cover 206. According to certain embodiments, the optical fiber cable 200 can comprise any number of fibers 202 selected from a range of approximately 5 to 10 fibers, depending on a desired power capacity and transport distance. In one such embodiment, the optical fiber cable 200 comprises a bundle of eight optical fibers 202 and is capable of transmitting laser energy having a power of at least about one gigawatt (GW) over a distance of at least about 1000 kilometers (km) with a loss of about 0.1 decibels (dB) and a power density of 0.4 $GW/cm^2$. In other embodiments, the optical fiber cable 200 comprises up to about 8000 of the optical fibers 202 to accommodate ultra high capacity power transport needs.

By bundling multiple fibers 202 into one optical fiber cable 200, the cable 200 can be used to alter power distribution to an endpoint, or an electric load coupled thereto, by simply controlling the number of fibers that 202 are used to transport power. In this manner, the transported optical power can be temporarily tailored to the power distribution needs of the electric load.

The cooling tube 204 is configured to increase a power capacity of the cable 200 by countering or dissipating the thermal heat generated by the optical fibers 202 during power transport. For example, the cooling tube 204 can be configured to keep a temperature of the cable 200 below a thermal expansion temperature for ZBLAN fiber, and well below the ZBLAN glass transition temperature (e.g., about 315 degrees Celsius (° C.)). In one example embodiment, the cooling tube 204 is configured to keep or maintain an overall temperature of the cable 200 below 100° C. In other embodiments, the cooling tube 204 may be configured to maintain cable temperature at or below a different threshold temperature.

According to embodiments, the cooling tube 204 includes a hollow interior filled with a suitable cooling substance, or coolant 208, such as, for example, air or other gas, or an appropriate oil or other liquid. For example, the coolant 208 may include mineral oils or alkylates, such as linear decyl benzene or branched nonyl benzene. In some embodiments, the coolant 208 is cool air, and the two ends of the cooling tube 204 (e.g., at either end of the cable 200) may be kept open to allow cool air to passively follow through the tube 204. In other embodiments, the coolant 208 is a cool air or liquid that is actively pushed through the tube 204 using a coolant management pump (not shown) disposed at one or more ends of the cable 200 (e.g., within the connector). In addition to having cooling properties, the substance 208 may also be configured to maintain a threshold amount of pressure within the cooling tube 204 and thereby, maintain a mechanical integrity of the tube 204. The exact amount of pressure required may vary depending on the number of fibers 202 included in the cable 200, the type of coolant 208, and the environment in which the cable 200 will be used (e.g., undersea or underground).

The cooling tube 204, itself, can be made of aluminum, acrylic, or other suitable material. For example, the cooling tube 204 may be made of aluminum if thicker walls and/or greater mechanical stability is required (e.g., where the cable 200 includes a large number of fibers 202 and therefore, transports lots of power and generates lots of heat). As another example, the cooling tube 204 may be made of acrylic if thinner walls are acceptable (e.g., where the cable 200 includes a small number of fibers 202 and therefore, transports less power and generates less heat). In embodiments where the cable 200 is transporting a low amount of power, the cooling tube 204 may be very small in diameter, or excluded altogether.

The outer protective cover 206 (also referred to as a "protective jacket") is comprised of Polyurethane (PUR) or Polyvinyl Chloride (PVC) and is configured to protect and insulate the fibers 202 and the cooling tube 204 from external physical forces and chemical deterioration. The protective cover 206 also provides the housing for encasing the interior components of the cable 200. In some embodiments, the outer protective cover 206 comprises multiple layers of materials concentrically arranged and bonded together to form the cover 206.

As shown in FIG. 4, the optical fiber cable 200 further comprises an inner thermal filler 210 disposed between the outer protective cover 206 and the central cooling tube 204 and surrounding each of the optical fibers 202. In embodiments, the thermal filler 210 is configured to maintain a spatial or mechanical integrity of the cable 200 and maintain a consistent temperature throughout the cable 200. For example, by fully surrounding each of the optical fibers 202, the thermal filler 210 isolates or prevents contact between individual fibers 202, which avoids the creation of hot spots if there is thermal build up at one or more of the fibers 202. Moreover, the thermal filler 210 can have a porous structure comprised of pores of different sizes to create variable insulation and structural integrity. As air flows through the pores, heat is transferred or moved throughout the filler 210, thus reducing or preventing thermal build up around select fibers 202. According to embodiments, the thermal filler 210 may be comprised of acrylic (such as, e.g., Polymethyl methacrylate (PMMA)) or other suitable material.

The optical fiber cable 200 has a length extending between a first end and a second end (e.g., length x shown in FIG. 3), and each of the central cooling tube 204, the outer protective cover 206, the inner thermal filler 210, and the plurality of optical fibers 202 extends the length of the cable 200. As such, each of the optical fibers 202 may extend substantially parallel to the central cooling tube 204, and the outer protective cover 206 may be concentrically aligned with the cooling tube 204.

According to embodiments, each optical fiber 202 is a multimode fiber having a fiber core 212 and a cladding 214 disposed around the fiber core 212. The fiber core 212 may be disposed in a center of the cladding 214 and may be fused or bonded to the cladding 214. The core 212 comprises ZBLAN fiber drawn in a microgravity environment and can be a step index fiber core with a diameter selected to optimize power transport along the length of the fiber 202. In some embodiments, the fiber core 212 has a diameter selected from a range of about 200 µm to about 400 µm. In other embodiments, the fiber core 212 has a diameter selected from a range of about 300 µm to about 500 µm. In one example embodiment, the core diameter is about 600 µm.

The cladding 214 can be configured to confine light within the fiber core 212 by causing total internal reflection at the boundary between the cladding 214 and the core 212. In embodiments, the cladding 214 can be made of a fluoride glass material that is similar to the ZBLAN fiber material but optically different. For example, the cladding 214 may be comprised of a material that has a lower refractive index than the refractive index of the fiber core 212. A thickness of the cladding 214 may be selected based on the core diameter, a desired overall diameter for the optical fiber 202, an optimal ratio between the two values for minimizing the thickness of the cladding 214 without comprising light transfer through the fiber 202, and/or a desired amount of flexibility for the overall fiber 202. As an example, in embodiments where the fiber core 212 has a diameter of about 400 µm, the cladding 214 (and therefore, the entire fiber 202) may have a diameter of about 460 µm. And in embodiments where the core diameter is small, the cladding diameter may be proportionally smaller as well.

An overall diameter of the optical fiber cable 200, or a diameter of the outer protective cover 206, can depend on the diameter of each individual fiber 202, the number of fibers 202 included in the cable 200, the diameters of the cooling tube 204 and the thermal filler 210, and/or a thickness of the outer protective cover 206. As an example, in the illustrated embodiment, the optical fiber cable 200 comprises a bundle of eight ZBLAN optical fibers 202, each having a diameter of about 500 microns, with the outer protective cover 206 having a diameter of about five millimeters (mm).

Figure 6:
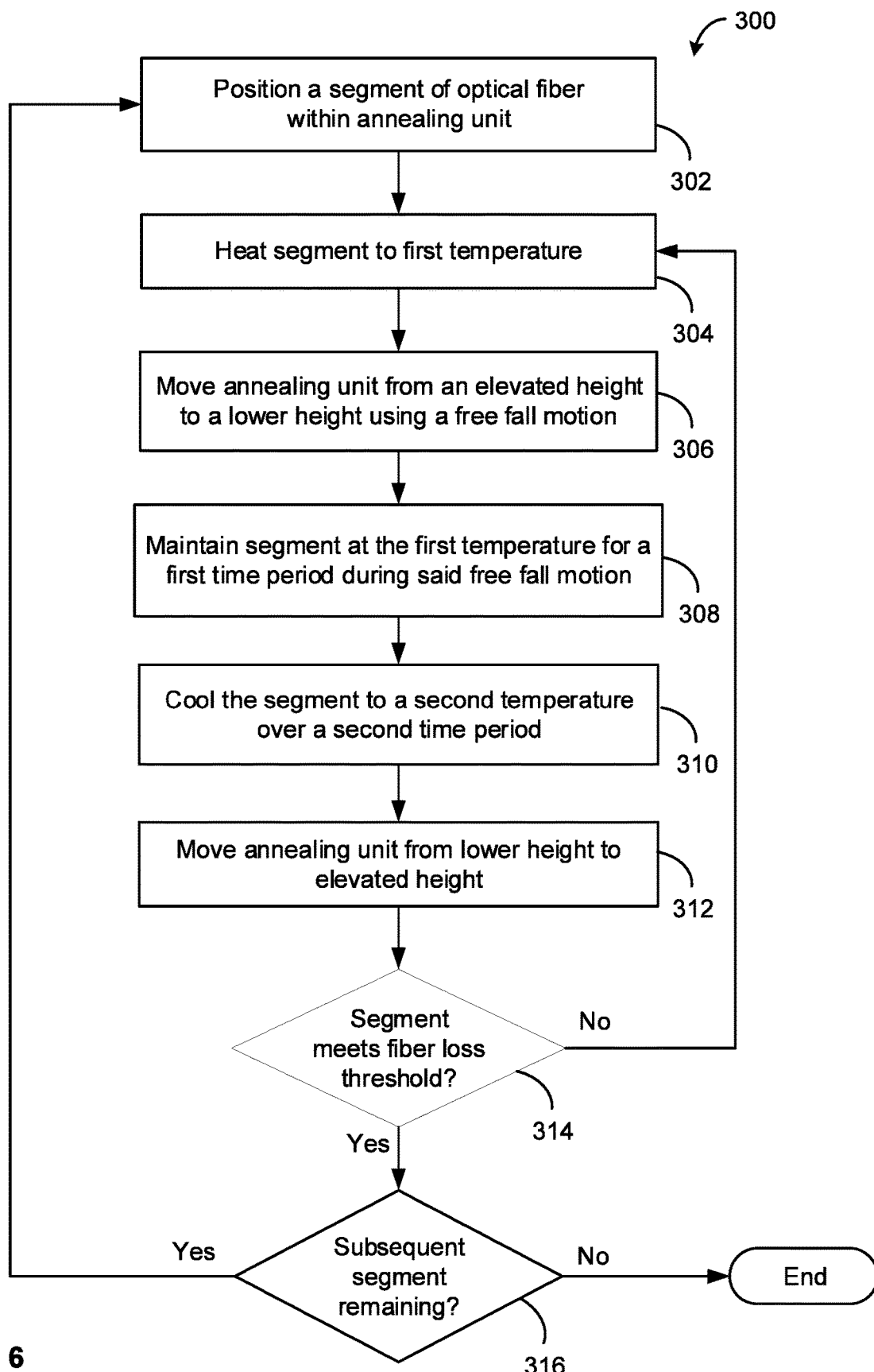
FIG. 6 is a flow diagram of an exemplary method of removing imperfections from a length of optical fiber, in accordance with certain embodiments.
Figure 8:
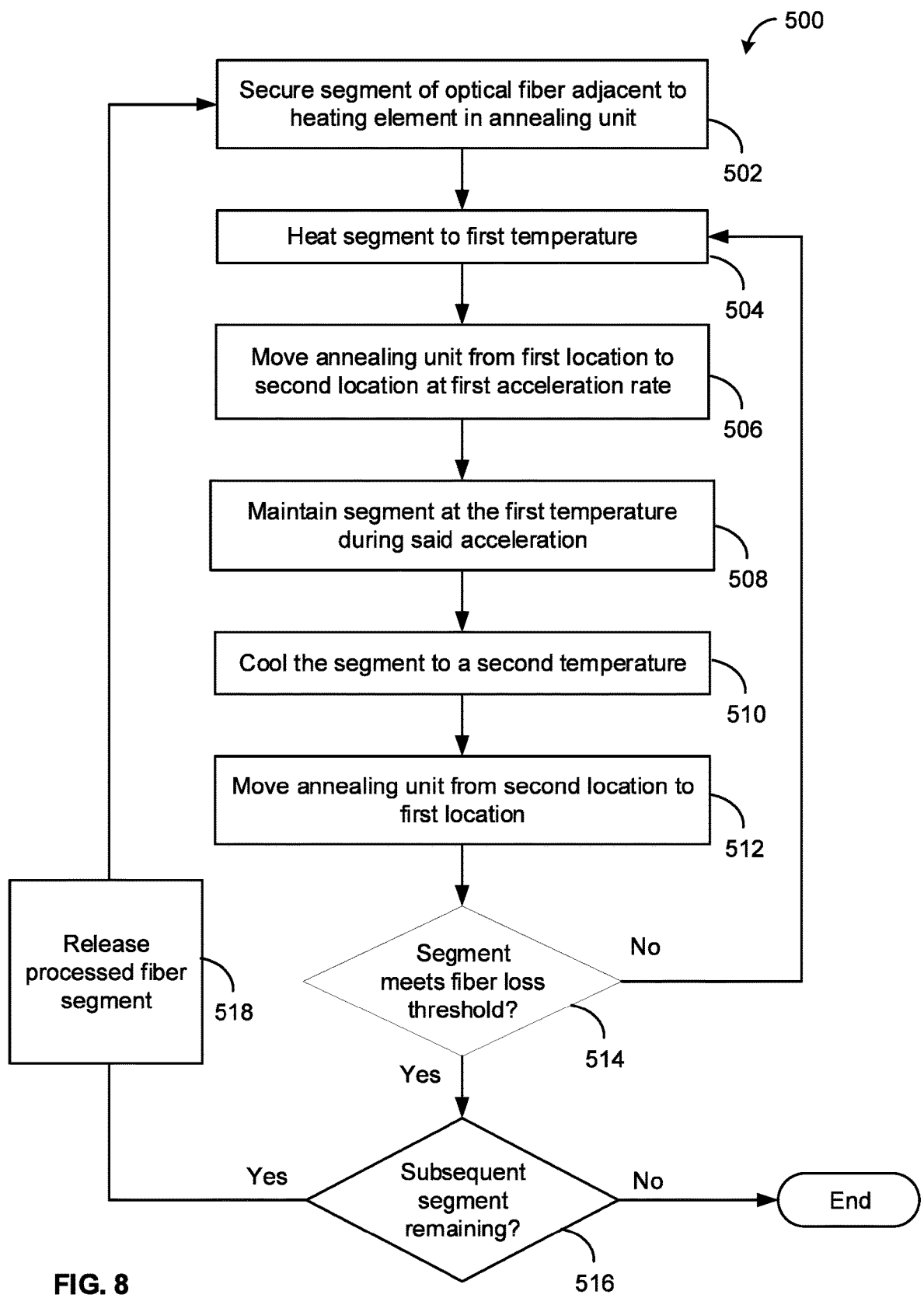
FIG. 8 is a flow diagram of another exemplary method of removing imperfections from a length of optical fiber, in accordance with certain embodiments.

Prior to manufacturing the optical fiber cable 200, the ZBLAN optical fibers 202 are refined or modified using one or more annealing techniques, such as, e.g., method 300 shown in FIG. 6 and/or method 500 shown in FIG. 8. These techniques are configured to remove or reduce imperfections in the ZBLAN core and cladding that create scattering losses, thereby optimizing the fibers 202 for longer transmissions. Moreover, while conventional methods for refining significant amounts of ZBLAN fiber require traveling to space (e.g., in LEO Satellites or the International Space Station) in order to obtain the requisite low or zero gravity environment, the annealing techniques described herein can be achieved without leaving Earth or using an aircraft.

Generally, the techniques include processing premade ZBLAN fiber, such as, e.g., the optical fibers 202 shown in FIG. 4, in very short segments to remove crystals and other imperfections in the fiber, thus improving the premade fiber. According to embodiments, this process comprises heating the fiber to a temperature that is well above a glass transition temperature (Tg) and above a crystallization temperature ($T_x$), but below a molten temperature ($T_m$) of ZBLAN. For example, in embodiments where the ZBLAN fiber has a $T_g$ of about 260 degrees Celsius (° C.), a $T_x$ of about 352° C., and a $T_m$ of about 450° C., the ZBLAN fiber can be heated to an annealing temperature (Ta) of about 370° C. during said processing. The process further comprises, accelerating the ZBLAN fiber, while heated at the annealing temperature, to the speed of Earth's gravity (e.g., 9.8 meters per seconds squared ($m/s^2$)), for a predetermined amount of time, so as to mimic free fall or a microgravity environment. Next, the process includes rapidly cooling or quenching the fiber to a quenching temperature ($T_q$) that is below the crystallization temperature. In some embodiments, the quenching temperature is about 10 to 20° C. below the annealing temperature. For example, in embodiments where the annealing temperature is about 370° C., the quenching temperature can be about 350° C. To help avoid introducing new crystallites during this process, the cooling step begins while the fiber is still in free fall, thus ensuring that the annealing step is complete before gravitational forces are present.

The process for perfecting the ZBLAN fiber can be monitored in-situ using a laser and photodetector combination, or other device capable of measuring a scattering profile of the fiber in real time, or the amount of incident light that is scattered away by imperfections in the material. The scattering profile indicates a crystallite percentage of the ZBLAN fiber and thus, can be used to determine an effectiveness of the annealing process. If the real-time monitoring results indicate a high crystallite percentage, the process may be repeated through multiple cycles until an optimal fiber loss metric is achieved.

Figure 5:
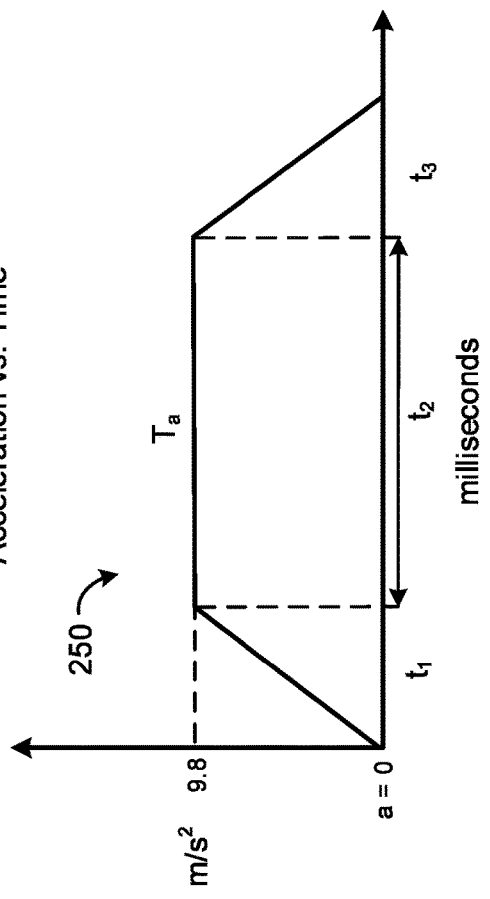
FIG. 5 is a graph illustrating an acceleration profile used to refine optical fiber, in accordance with certain embodiments.

FIG. 5 illustrates an exemplary acceleration profile 250 of ZBLAN fiber during the processing techniques described herein, in accordance with embodiments. As shown, the acceleration profile 250 varies across three time periods. During a first time period $t_1$, the fiber is accelerated from zero acceleration (a=0) to a standard freefall acceleration, or the acceleration due to gravity ($g_o$), which equals about 9.8 $m/s^2$. Also during the first time period, the fiber is heated from a starting temperature to an annealing temperature Ta (e.g., 370° C.). This first time period $t_1$ may also be referred to as the "ramp up" period. During a second time period $t_2$, the fiber continues to travel at the acceleration of gravity. Also during the second time period, the fiber continues to be heated to, or is held at, the annealing temperature for a predetermined length of time. During a third time period $t_3$, the fiber is decelerated back to standstill. Also during the third time period, the fiber is cooled down to a quenching temperature $T_q$ for a preset length of time.

In embodiments, the second time period $t_2$ includes a first predetermined length of time for heating the fiber and a second predetermined length of time for cooling the fiber. The first length of time may be considered the fiber's annealing period, as it includes the time period during which the fiber is annealed, or heated at the annealing temperature. The second length of time forms part of the fiber's cooling period. This cooling period also includes at least a portion of the third time period $t_3$, namely the preset length of time required to cool the fiber to the quenching temperature. According to embodiments, the second length of time is positioned at the end of the second time period $t_2$ so that the cooling period begins during acceleration. This ensures that the fiber is still in free fall when the fiber temperature drops below the annealing temperature, thus preventing new crystallites from forming while the fiber is cooling. In various embodiments, the first length of time is longer than the second length of time. In some embodiments, the annealing period and the cooling period are substantially equal in length.

The exact length of time for each of the three periods ($t_1$, $t_2$, and $t_3$) can be determined based on a number of factors. For example, the first time period may depend on an acceleration rate of the fiber and a heating rate of the element used to heat the fiber. The second time period may depend on a distance to be traveled by the fiber during acceleration (e.g., the free fall drop) and a length of the fiber to be annealed, in addition to the free fall acceleration. The third time period may depend on a critical cooling rate (CCR) associated with the ZBLAN fiber, as well as a deceleration rate of the fiber. As an example, in some embodiments, the ZBLAN fiber has a critical cooling rate of 40° C./s. In such cases, a fiber length of about one meter may require a second time period of about 320 milliseconds (ms), with the first and third time periods being much shorter (e.g., 100 ms). While FIG. 5 depicts time periods $t_1$ and $t_3$ as being about equal, in other cases, the two time periods may vary or be different from each other, depending on the factors listed above, for example.

In some embodiments, the acceleration rate, or speed at which the fiber is accelerated during the first time period, can be determined based on certain properties of the ZBLAN fiber, such as, for example, the level of scattering and absorption of fiber lengths at a given wavelength (e.g., 650 nanometers (nm)), as well as the mechanism (e.g., actuator) used to the launch the fiber into free fall, or otherwise release the fiber into the gravitation field. Similarly, the deceleration rate, or speed at which the fiber is decelerated during the second time period, can be determined based on the same fiber properties, as well as the mechanism (e.g., grippers or brakes) used to apply frictional forces for slowing down the fiber movement.

Figures 7A, 7B:
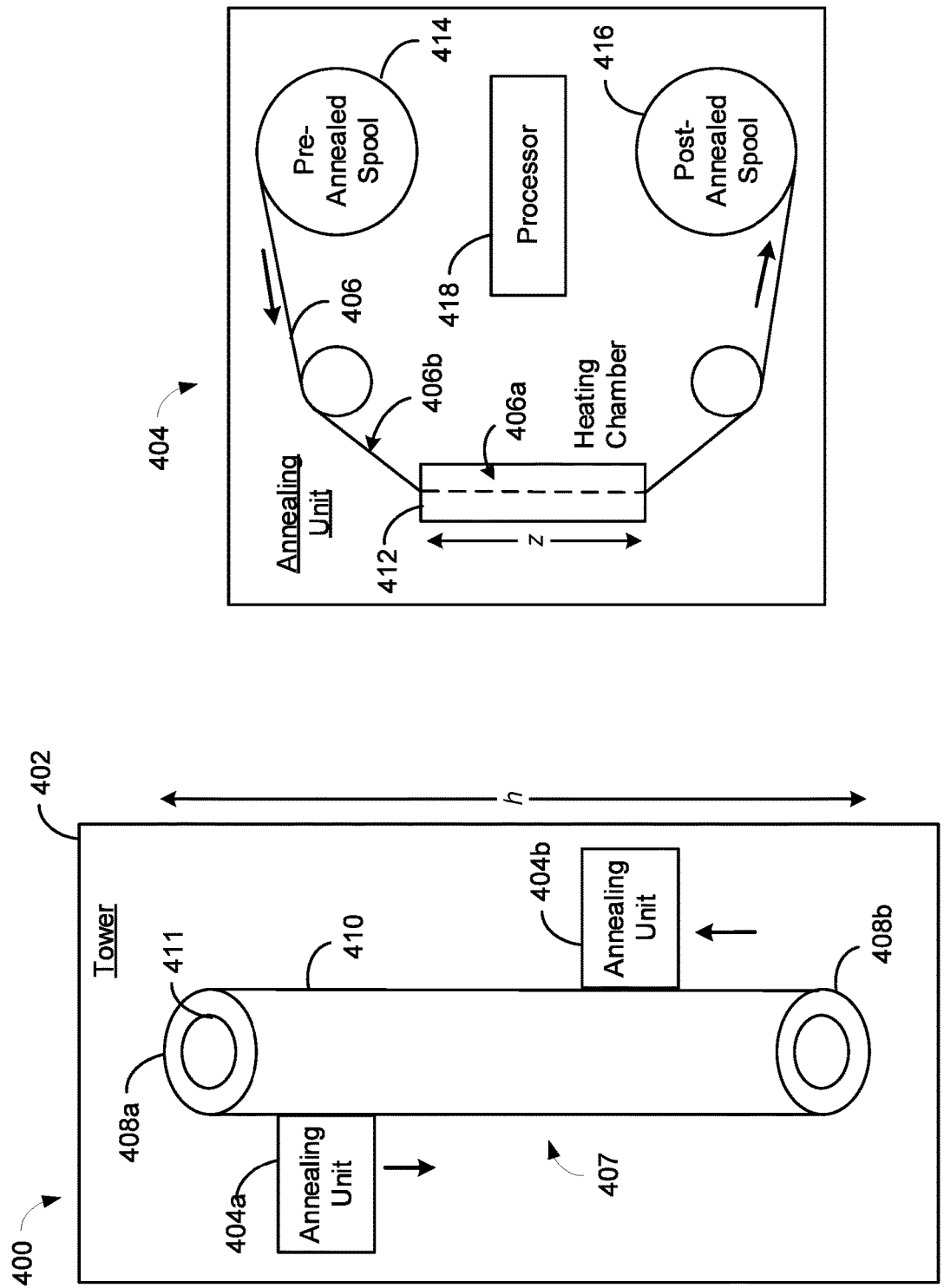
FIG. 7A is a functional block diagram of an exemplary refining system for reducing imperfections in optical fiber using the method of FIG. 6, in accordance with certain embodiments.
FIG. 7B is a functional block diagram of an exemplary annealing unit included in the refining system of FIG. 7A, in accordance with certain embodiments.

FIG. 6 illustrates a first exemplary process or method 300 of removing imperfections from a length of optical fiber comprising a fiber core and a cladding around the fiber core. In embodiments, the optical fiber may be the same as or substantially similar to the optical fiber 202 shown in FIG. 4. FIG. 7A illustrates an exemplary fiber refining system 400 configured to remove imperfections in a length of ZBLAN fiber. In some embodiments, the system 400 can be used to carry out the process 300. Accordingly, in the following paragraphs, process 300 will be described with reference to the system 400 for ease of illustration. However, it should be appreciated that the process 300 can be implemented using other systems or devices capable of annealing ZBLAN fiber, in other embodiments.

Referring initially to FIG. 7A, the fiber refining system 400 comprises a chamber or tower 402 (also referred to as a "drop tower") and one or more annealing units 404 movably disposed within the tower 402 and configured to process a given segment of optical fiber 406, in accordance with embodiments. The tower 402 can be configured to mimic a microgravity environment by placing each annealing unit 404 in free fall for a predetermined amount of time (e.g., the second time period shown in FIG. 5). In one example embodiment, the tower 402 is about 44 meters tall and is configured to provide at least three seconds of free fall for processing a segment of optical fiber 406 that is about 10 meters long. While FIG. 7A shows the tower 402 as comprising two annealing units 404a and 404b, it should be appreciated that, in other embodiments, the tower 402 may include only one appealing unit 404 or more than two annealing units 404. In embodiments, the fiber refining system 400 further comprises one or more processors in communication with the tower 402, the one or more annealing units 404, and/or various other components of the system 400, the one or more processors being configured to carry out the process 300 or otherwise control the components of the system 400 in order to refine the optical fiber 406 in accordance with the techniques described herein.

FIG. 7B illustrates an exemplary annealing unit 404, in accordance with embodiments. As shown, optical fiber 406 is disposed within the annealing unit 404 and is configured to experience free fall, or gravitational acceleration, when the unit 404 is dropped or released within the tower 402. The optical fiber 406 comprises a ZBLAN fiber core and a cladding disposed around the fiber core and may be substantially similar to, or the same as, the optical fiber 202 shown in FIG. 4. Though FIG. 7B shows the optical fiber 406 as being fully housed within the annealing unit 404, in other embodiments, the annealing unit can be configured to house a portion of the optical fiber, the remaining portion being disposed outside the annealing unit.

Referring back to FIG. 7A, the tower 402 further comprises a moveable component 407 coupled to the one or more annealing units 404 and configured to cause each annealing unit 404 to move from an elevated height to a lower height in a free fall motion, for example, as shown by annealing unit 404a. The moveable component 407 can be further configured to move the annealing unit(s) 404 from the lower height back up to the elevated height, for example, as shown by annealing unit 404b. According to embodiments, a distance, h, between the elevated height and the lower height may be selected to ensure that the free fall motion lasts long enough to cause refinement of a given length of ZBLAN fiber at least once, or complete at least one cycle of the annealing and cooling process described herein (e.g., method 300 shown in FIG. 6). In some embodiments, the distance h is selected in order to allow completion of several annealing cycles within one drop. The acceleration profile 250 shown in FIG. 5 may be used to calculate the amount of time (e.g., number of milliseconds) required for the free fall period (e.g., the second time period $t_2$) in each cycle, as well as the lengths of the acceleration (or ramp up) and deceleration time periods (e.g., first and third time periods $t_1$ and $t_3$). The acceleration profile 250 may also determine the length of fiber that can be processed within one cycle. In one exemplary embodiment, the distance, h, is approximately 44 meters (m), the annealing unit 404 takes about three seconds to travel this distance, and in that time, the annealing unit 404 is configured to process about 10 meters of fiber (e.g., 10 m/cycle).

In some embodiments, the moveable component 407 includes a pulley system comprised of one or more pulleys 408 and one or more cables 410 slidably coupled to the pulley(s) 408. Each cable 410 may be slidably coupled to at least one annealing unit 404, and may be configured to carry and support the unit 404 as the pulley system 407 moves the unit 404 from the elevated height to the lower height and then back up to the elevated height.

For example, in the illustrated embodiment, the pulley system 407 comprises a first pulley 408a positioned at or adjacent to the elevated height and a second pulley 408b positioned at or adjacent to the lower height. As shown, the cable 410 may form a loop around the pulleys 408a and 408b. The pulleys 408a and 408b can be configured to rotate in two directions: a first direction for causing the annealing unit 404 to travel from the elevated height to the lower height, and a second, opposite direction for causing the annealing unit 404 to move back up to the elevated height from the lower height. The pulley system 407 can be configured to place the annealing unit 404 in free fall as the unit 404 slides down the cable 410 towards the lower height. For example, the cable 410 may be configured to apply zero or minimal frictional force on the annealing unit 404 as the unit 404 travels towards the lower height. Upon reaching the lower height, the pulleys 408a and 408b may turn in unison in the second direction to pull the cable 410, and the annealing unit 404 attached to it, back up the same path towards the elevated height.

In other embodiments, the pulley system 407 may comprise multiple independent pulley systems, each system being coupled to a separate annealing unit 404. In such cases, the annealing units 404 may be independently dropped from the elevated height to the lower height on separate cables and independently pulled back up to the elevated height using separate pulleys. Other configurations for the movement component 407 are also contemplated, including, for example, a lift system configured to drop the annealing unit from the elevated height onto a platform disposed at the lower height and raise the platform and the annealing unit back up to the elevated height.

In embodiments, the tower 402 further includes a braking system 411 coupled to the moveable component 407 and configured to control a movement of the moveable component 407 and/or the annealing unit 404 coupled to said component 407. For example, in the illustrated embodiment, the braking system 411 may be coupled to one or more of the pulleys 408 and/or the cable 410 and may be configured to stop a free fall acceleration of the annealing unit 404 by halting rotation of the pulley(s) 408 in the first direction, or otherwise preventing movement of the cable 410 between the first pulley 408a and the second pulley 408b. As an example, the braking system 411 may include on one or more brakes (not shown) coupled to the cable 410 and/or the one or more pulleys 408 and may be configured to activate those brakes when a stopping motion is desired. In some cases, the braking system 411 can be used to stop the annealing unit 404 at the lower height when traveling in the first direction and also stop the annealing unit 404 at the elevated height when traveling in the second direction. In some embodiments, the braking system 411 is further configured to initiate the free fall movement of the annealing unit 404 by releasing the brakes so that the pulleys 408 are rotated in the first direction and/or the cable 410 is otherwise free to travel towards the lower height.

As shown in FIG. 7B, each annealing unit 404 comprises a heating chamber 412 for heating the optical fiber 406, or more specifically, a given segment 406a of the optical fiber 406 that is disposed within the chamber 412. The annealing unit 404 further comprises one or more components for feeding incremental portions of the optical fiber 406 through the heating chamber 412. In particular, the annealing unit 404 includes a first spool 414 configured to hold or store an unmodified or pre-annealed length of the optical fiber 406 and feed the unmodified optical fiber 406 into the heating chamber 412. In addition, the annealing unit 404 includes a second spool 416 configured to receive and store a modified or post-annealed length of the optical fiber 406, including the modified segments of optical fiber 406 that exit the heating chamber 412. Thus, the entire length of the optical fiber 406 may be stored on the first spool 414 initially and may gradually transition to the second spool 416 as more and more of the optical fiber 406 is processed by the system 400. The annealing unit 404 may also include one or more pulleys or reels to help guide the optical fiber 406 between the first spool 414, the heating chamber 412, and the second spool 416. According to embodiments, each segment 406a received at the heating chamber 412 may have a substantially uniform length, such as, for example, approximately ten meters (m). An exact length of the segment 406a can depend on the distance that is available for free fall (e.g., distance h in FIG. 7A) and/or a physical limitation of the annealing unit 404.

According to embodiments, as part of the process to remove imperfections from the optical fiber 406, the heating chamber 412 is configured to heat the given segment 406a of the optical fiber 406 to a first temperature that is greater than a crystallization temperature ($T_x$) of the fiber core and much greater than a glass transition temperature ($T_g$) of the fiber core, but lower than a molten temperature ($T_m$) of the fiber. In this manner, the first temperature can be high enough to remove crystallizations in the fiber core and cladding, but low enough to avoid completely melting the glass. In embodiments, the ZBLAN fiber has a glass transition temperature of about 260° C., a crystallization temperature of about 352° C., and a molten temperature of about 450° C. Thus, the first temperature may be any value between 352° C. and 450° C. In one embodiment, the first temperature is about 370° C.

As described herein, the segment 406a remains at the first temperature while the annealing unit 404 is in free fall. For example, the heating chamber 412 may be configured to heat the given segment 406a to the first temperature just before the annealing unit 404 begins the free fall motion, and may continue to heat the given segment 406a during said free fall motion to keep the first segment 406a at the first temperature for a predetermined amount of time (i.e. the annealing period). According to embodiments, the predetermined amount of time can depend on the length of the fiber segment 406a as well as other factors, as described herein.

In embodiments, the heating chamber 412 comprises a heating coil or any other suitable heating element capable of being precisely controlled to a specific temperature. For example, the heating chamber 412 may include a ceramic or metal heating element that can be set to a desired temperature using an input value. In one example embodiment, the heating element has a specific heat capacity of about 0.888 J/g·° C. to ensure that the heating element can change temperature quickly enough.

In some embodiments, the heating chamber 412 further comprises a thermocouple or other device for monitoring a real time temperature of the heating element and causing the heating element to adjust its output temperature as needed. For example, the thermocouple may be electrically connected to the heating element and may cause the heating element to increase or decrease its output temperature depending on how the real-time temperature readings compare to the desired temperature value.

In some embodiments, the heating chamber 412 further comprises a separate processor for controlling these operations of the heating element and thermocouple. In other embodiments, the heating chamber 412 is electrically coupled to processor 418 of the annealing unit 404, and processor 418 is configured to manage the heating functions of the heating chamber 412. In still other embodiments, the heating chamber 412 may be electrically coupled to one or more other processors of the system 400 for carrying out the operations described herein.

As a next step in the process to remove imperfections, the annealing unit 404 can be further configured to rapidly cool or quench the heated segment 406a to a second temperature that is below the crystallization temperature ($T_x$) but above the glass transition temperature ($T_g$). In one example embodiment, the second temperature is about 350° C., or about 10 to 20° C. lower than the first temperature. In addition, the annealing unit 404 may be configured to cool the heated segment 406a at a critical cooling rate associated with the optical fiber, which determines how long the cooling process takes (i.e. the cooling period). In embodiments, the critical cooling rate of ZBLAN fiber is 40° C./s. In such cases, cooling the fiber segment 406a, which is about 10 meters long, takes about two seconds.

In some embodiments, the fiber segment 406a may be cooled upon exiting the heating chamber 412. For example, the second spool 416 may be configured to pull the given segment 406a of optical fiber 406 out of the heating chamber 412 at a rate or speed that is selected based on the critical cooling rate and an ambient temperature of the annealing unit 404, so that the heated segment 406a cools to the second temperature upon reaching the second spool 416. In other embodiments, the given fiber segment 406a may be cooled to the second temperature within the heating chamber 412. For example, a temperature of the heating chamber 412 may be rapidly lowered to the second temperature in order to quench the heated segment 406a. In such cases, the heating element may be lowered to the second temperature by, for example, reducing or removing an amount of current applied to the heating element.

As shown in FIG. 7B, the annealing unit 404 further comprises one or more processors 418 (also referred to herein as "processor 418") configured to control one or more functions of the annealing unit 404, for example, in accordance with process 300 of FIG. 6. In other embodiments, the one or more processors 418 may be included in another component of the system 400 and configured to be in communication with the annealing unit 404 and/or the components included therein for controlling the operations of the annealing unit 404.

In some embodiments, the processor 418 is electrically coupled to the heating chamber 412 for controlling a temperature setting of the heating element within the chamber 412. For example, the processor 418 may increase the temperature setting to the first temperature during annealing. The processor 418 may also be configured to increase or decrease the temperature setting based on temperature readings received from the heating chamber 412 or a sensor disposed therein (e.g., thermocouple).

In some embodiments, the processor 418 is electrically coupled to the first and second spools 414 and 416 in order to control movement of the spools, including a rotation speed and direction of the spools. For example, the processor 418 can be configured to cause the second spool 416 to turn in a first direction for pulling the given segment 406a out of the chamber 412 and drawing a subsequent segment 406b of the optical fiber 406 into the chamber 412. The processor 418 can also be configured to cause the first spool 414 to turn in a second direction opposite the first direction, in order to reverse a direction of movement of the optical fiber 406, for example, when the given segment 406a must be returned to the heating chamber 412 for additional processing.

In addition, the processor 418 can be configured to control a speed at which the first and/or second spools 414 and 416 rotate, thus controlling the rate or speed at which the optical fiber 406 enters and exits the heating chamber 412. In some embodiments, the rotation speed of the second spool 416 is selected so that, as the heated segment 406a exits the chamber 412, the segment 406a rapidly cools to the second temperature at the critical cooling rate associated with the optical fiber. For example, if the heated segment 406a has a length of one meter, and the spool size, or circumference, of the spool is also about one meter, the spool 414, 416 may be configured to rotate at a speed or rate of one rotation per second in order to deliver one meter of fiber (or one fiber segment 406a) to the heating chamber 412 per second. In such embodiments, the annealing unit 404 can be configured to process one meter of fiber every second. As will be appreciated, the rotation rate can be adjusted as needed to accommodate larger segments of fiber (e.g., 10 meters long).

In various embodiments, the annealing unit 404 conducts a post-annealing analysis of the given segment 406a to determine whether additional processing is required to obtain optimal results. In particular, the annealing unit 404 further comprises one or more lasers or other sensors for monitoring or measuring a scattering profile of the segment 406a after the cooling step is complete. The measured information can be provided to the processor 418 for real time analysis. The processor 418 can be configured to determine a fiber loss value of the annealed segment 406a based on the measured information and compare the measured value to a fiber loss threshold stored in a memory. If the threshold is not met, the processor 418 can be configured to return the given segment 406a to the heating chamber 412 for additional processing, for example, by causing the second spool 416 to rotate in a second direction (e.g., clockwise) that moves the segment 406a backwards.

More specifically, the lasers (e.g., a 632 nanometers (nm) laser) can be configured to direct light towards the fiber segment 406a after it exits the heating chamber 412 or while its inside the chamber 412, depending on where the cooling process occurs. The lasers may be appropriately situated within the heating chamber 412 or in another location of the annealing unit 404. The annealing unit 404 may also comprise a photodetector positioned opposite the laser, such that the fiber segment 406a passes between the laser and the photodetector, or crosses a line of sight established between the two devices. The photodetector can be configured to receive the light passing through the fiber segment 406a and generate an output representing an amount of detected laser power or light (e.g., a current value). For example, the photodetector may be configured to measure an amount of red light (e.g., 650 nm) that is not scattered away by crystallization, or is able to pass straight through the fiber glass.

The processor 418 may be electrically coupled to the photodetector and configured to compare the photodetector output to a threshold value, or expected amount of current. If the measured amount is too low, the processor 418 may send the fiber segment 406a back into the heating chamber 412 to be processed again. In some embodiments, the annealing and cooling process may be repeated until an optimal scattering coefficient or other fiber loss metric is achieved for a given wavelength of light (e.g., 0.1 decibels per kilometer (dB/km) at 650 nm).

Referring back to FIG. 6, process 300 will now be described with reference to the components of system 400. In embodiments, the process 300 may be implemented using one or more processors of the system 400, including, for example, the processor 418. As shown, process 300 begins at block 302 with placing or positioning a given segment of optical fiber (e.g., fiber segment 406a) within a heating chamber (e.g., heating chamber 412) of an annealing unit (e.g., annealing unit 404) for processing or refining. The fiber segment may be moved into the heating chamber by rotating a spool carrying pre-annealed fiber (e.g., spool 414) in a first direction towards the heating chamber. At block 304, the fiber segment is heated to a first temperature that is greater than the crystallization temperature ($T_x$) of the optical fiber but lower than a molten temperature ($T_m$) of the fiber. For example, the first temperature may be about 370° C. or any other value between 352° C. and 450° C.

At block 306, the annealing unit is dropped or moved from an elevated height to a lower height using a free fall motion, such that the fiber segment within the annealing unit is accelerated at a rate of Earth's gravity (e.g., 9.8 m/s$^2$). The free fall motion may be achieved by controlling movement of a moveable component (e.g., pulley system 407) coupled to the annealing unit. In addition, the moveable component may be configured to maintain the free fall motion for a minimum amount of time (e.g., three seconds). At block 308, a temperature of the fiber segment is maintained at the first temperature for a first time period during said free fall motion. (This first time period is also referred to herein as the "annealing period.")

At block 310, the fiber segment is cooled to a second temperature over a second time period (also referred to herein as the "cooling period"). The second temperature may be below the crystallization temperature ($T_x$) but above the glass transition temperature ($T_g$). In one example embodiment, the second temperature is about 350° C., or about 10 to 20° C. lower than the first temperature. The fiber processing cycle may be considered complete once the second time period comes to an end.

According to embodiments, the second time period may begin while the fiber segment is in free fall motion and may end after the free fall motion has stopped, or while the fiber segment is in deceleration (e.g., in the third time period $t_3$ in FIG. 5). Thus, the amount of time allotted for free fall may be spent both heating and, at least partially, cooling the fiber segment. In some embodiments, the first time period is substantially equal to the second time period. In other embodiments, the second time period may be longer than the first time period. As will be appreciated, the exact length of the first time period may be determined based on a physical length of the fiber segment, as well as other factors, as described herein.

At block 312, the annealing unit is moved from the lower height to the elevated height using the moveable component. At block 314, one or more processors (e.g., processor 418) of the annealing unit determines whether the processed fiber segment meets a fiber loss threshold stored in a memory of the unit. If the determination at block 314 is no (i.e. the threshold is not met), the process 300 moves back to block 304 to begin re-processing the fiber segment (i.e. repeat blocks 304 through 314). If the determination at block 314 is yes (i.e. the threshold is met or exceeded), the process 300 continues to block 316.

At block 316, the one or more processors determines whether subsequent fiber segments remain in the pre-annealed fiber spool (e.g., first spool 414). If the determination at block 316 is no, the process 300 ends. If the determination at block 316 is yes, the process 300 moves back to block 302 to begin processing a next segment of fiber. Thus, the process 300 may be repeated over and over until the entire length of pre-annealed fiber is sufficiently improved, or meets a target fiber loss threshold (e.g., less than 0.1 dB/km at 650 nm).

Figure 9:
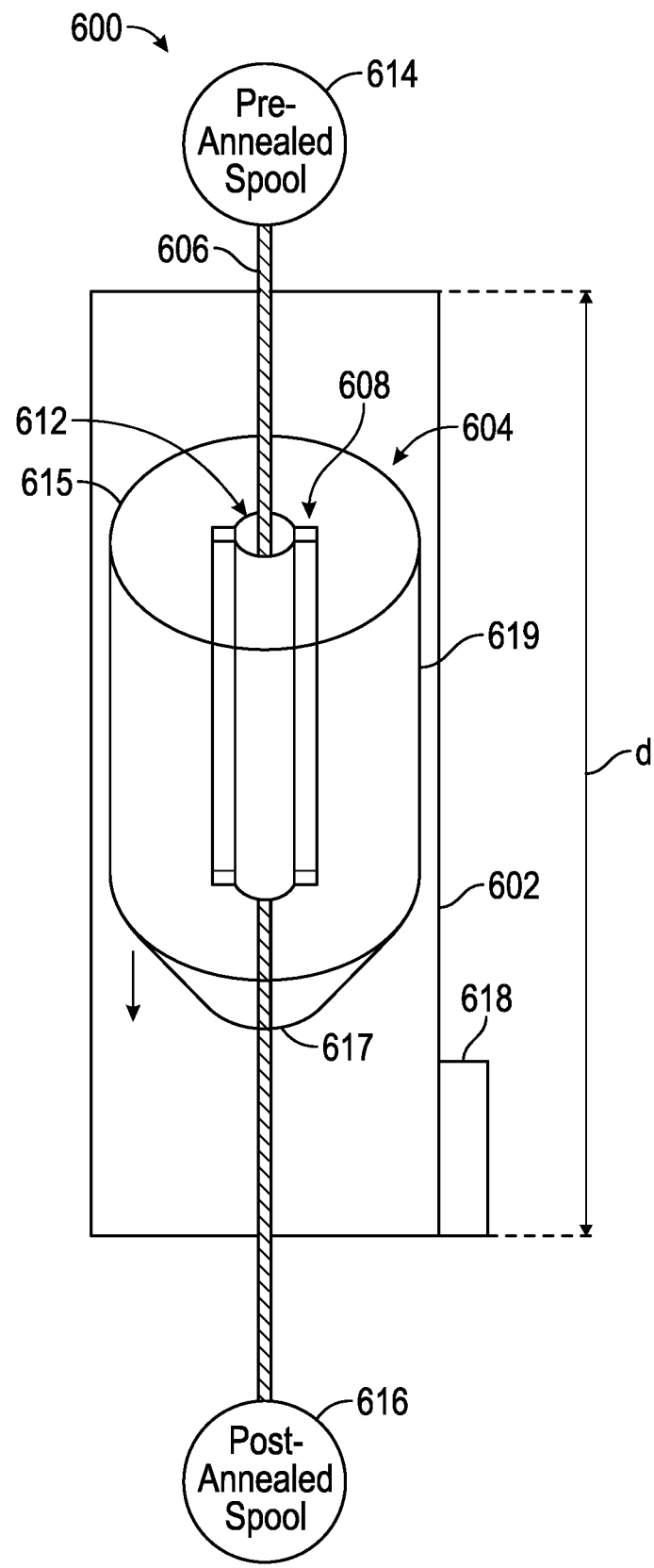
FIG. 9 is a schematic diagram of an exemplary refining system for reducing imperfections in optical fiber using the method of FIG. 8, in accordance with certain embodiments.

FIG. 8 illustrates a second exemplary method or process 500 of removing imperfections from a length of optical fiber comprising a fiber core and a cladding around the fiber core, in accordance with embodiments. As an example, the optical fiber may be the same as or similar to the optical fiber 202 shown in FIG. 4. FIG. 9 illustrates another exemplary fiber refining system 600 configured to remove imperfections in a length of ZBLAN fiber. In some embodiments, the system 600 can be used to carry out the process 500. Accordingly, in the following paragraphs, process 500 will be described with reference to the system 600 for ease of illustration. However, it should be appreciated that the process 500 can be implemented using other systems or devices capable of annealing ZBLAN fiber, in other embodiments.

Referring initially to FIG. 9, the fiber refining system 600 comprises an accelerating chamber 602 and an annealing unit 604 movably disposed within the chamber 602 and configured to process a given length of optical fiber 606, in accordance with embodiments. The optical fiber 606 comprises a ZBLAN fiber core and a cladding disposed around the fiber core and is substantially similar to, or the same as, the optical fiber 202 shown in FIG. 4. The accelerating chamber 602 can be configured to mimic a microgravity environment by placing the annealing unit 604 (also referred to as a "spindle") in free fall for a predetermined amount of time (e.g., second time period $t_2$ shown in FIG. 5). In one example embodiment, the accelerating chamber 602 is about 0.5 meter tall and is configured to provide about 320 milliseconds of free fall for processing a segment of optical fiber 606 that is about three inches long.

As shown in FIG. 9, the annealing unit 604 has a generally cylindrical shape with a central opening for receiving the optical fiber 606. In addition, the annealing unit 604 comprises a clamping system 608 and a heating chamber 612 positioned within the central opening adjacent each other, as described in more detail herein with respect to FIG. 11. In embodiments, the clamping system 608 can be configured to grab or hold a given segment 606a of the optical fiber 606 within a hollow interior 613 of the heating chamber 612 as the annealing unit 604 free falls through the accelerating chamber 602. Once the segment 606a is sufficiently processed (e.g., annealed and quenched), the clamping system 608 can be configured to release the processed segment 606a and grab a new or next segment of optical fiber for processing. This release and grab action may occur at any appropriate time or location of the accelerating chamber 602, such as, for example, as the annealing unit 604 returns to a top or starting location of the accelerating chamber 602, after the annealing unit 604 reaches the top location, or while the annealing unit 604 is still at a bottom location of the chamber 602. In this manner, the optical fiber 606 can be processed segment by segment with each drop or free fall acceleration of the annealing unit 604.

As illustrated, the system 600 further comprises a first spool 614 configured to hold or store a pre-annealed length of the optical fiber 606 and a second spool 616 configured to hold or store a post-annealed length of the optical fiber 606. The system 600 also includes one or more processors 618 (also referred to herein as "the processor 618") configured to control operation of one or more components of the system 600, such as, for example, the accelerating chamber 602, the annealing unit 604, the heating chamber 612, the clamping system 608, and/or the spools 614, 616, as described in more detail herein. In some embodiments, the one or more processors 618 are configured to carry out the process 500 shown in FIG. 8 or otherwise control the components of the system 600 in order to refine the optical fiber 606 in accordance with the techniques described herein.

As shown, the first spool 614 may be disposed adjacent to an entrance of the accelerating chamber 602, and the second spool 616 may be disposed adjacent to an exit of the accelerating chamber 602. During operation, the first spool 614 may be rotated in a first direction so that the optical fiber 606 can travel from the first spool 614 through the accelerating chamber 602 and onto the second spool 616 after being processed. As shown, the fiber 606 passes through the entire chamber 602, including the annealing unit 604 and the heating chamber 612 disposed therein. In some cases, the second spool 616 and/or the first spool 614 may be rotated in a second direction opposite the first direction in order to move the optical fiber 606 backwards through the accelerating chamber 602, for example, in cases wherein a segment of fiber 606 must be re-processed or further refined, as described herein.

Figure 10C:
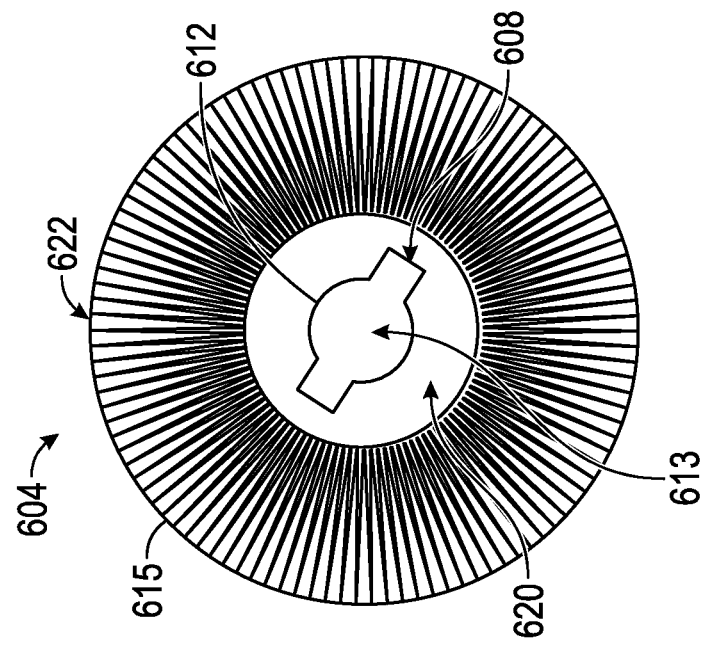
FIGS. 10A, 10B, and 10C are schematic diagrams illustrating a front perspective view, a bottom perspective view, and a top view of an exemplary annealing unit included in the refining system of FIG. 9, in accordance with certain embodiments.
Figure 10B:
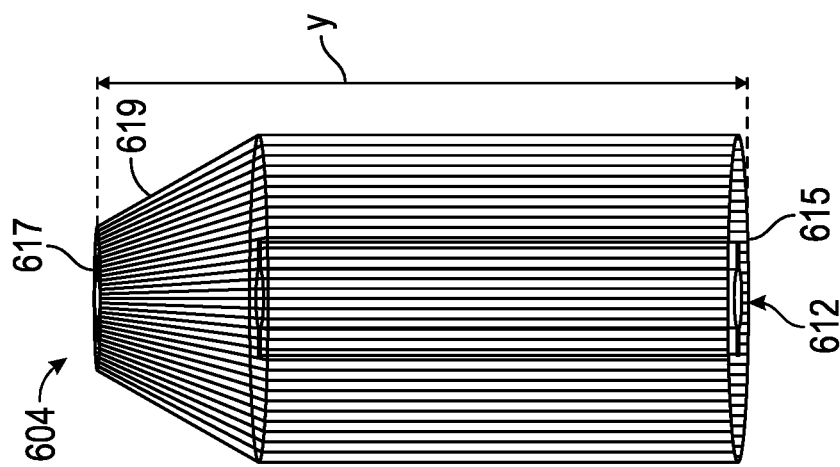
Figure 10A:
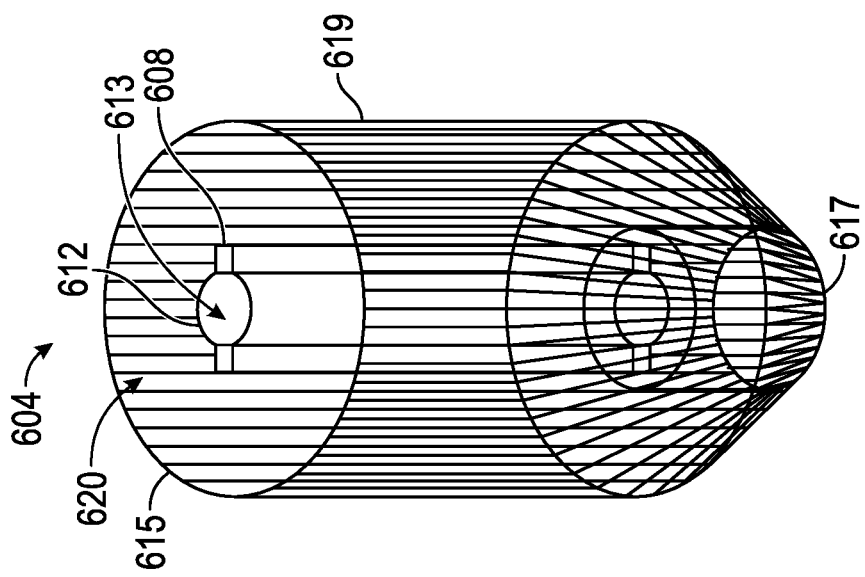

Referring additionally to FIGS. 10A through 10C, the annealing unit 604 has a generally annular outer wall 619 that extends between the top and bottom ends 615 and 617 of the unit 604 and has an open center 620 configured to house the heating chamber 612 and clamping system 608. In some embodiments, a distance y between the top end 615 and the bottom end 617 is about three inches. In other embodiments the annealing unit 604 may be longer or shorter in length, depending on, for example, a height of the accelerating chamber 602 and/or a length of optical fiber 606 to be processed in a given cycle. Though not shown, the heating chamber 612 may be coupled to at least one of the open top end 615, the open bottom end 617, and/or the outer wall 619 of the annealing unit 604.

The heating chamber 612 can be configured to receive the optical fiber 606 through its hollow interior 613 as the fiber 606 passes through the annealing unit 604. The hollow interior 613 may be defined by an open top for receiving the fiber segment within the chamber 612 and an open bottom for allowing the fiber segment exit the chamber 612. The heating chamber 612 further comprises a heating coil or other suitable heating element capable of being precisely controlled to a desired temperature. The heating element may be configured to form the hollow interior 613 or otherwise surround the fiber segment 606a disposed within the heating chamber 612. For example, in some embodiments, the heating element may be annularly arranged so that the walls of the heating element form the hollow interior 613.

In some embodiments, the heating chamber 612 comprises a ceramic heating element. In other embodiments, the heating chamber 612 comprises a metal heating element. In one exemplary embodiment, the heating element is configured to have a specific heat capacity of about 0.888 J/g·° C. to ensure that the heating element can change temperature quickly. Like the heating chamber 412 in FIG. 7B, the heating chamber 612 can be configured to heat a given segment of the optical fiber 606 to a first temperature that is greater than the crystallization temperature of the optical fiber 606 and less than the molten temperature of the fiber 606. For example, in some embodiments, the first temperature is about 370° C.

In some embodiments, the outer wall 619 of the annealing unit 604 includes a plurality of longitudinal openings 622 that extend from the open top end 615 to the open bottom end 617 and are substantially evenly distributed around an entire circumference of the wall 619, giving the annealing unit 604 a basket-like appearance, as shown in FIGS. 10A through 10C. (In FIG. 9, the outer wall 619 is shown with a plain surface for ease of illustration.) An exact width of each opening 622 may depend on the circumference of the outer wall 619 and a desired number of openings 622, or a desired ratio of solid structure to open space for the outer wall 619. In some embodiments, the heating chamber 612 may have a partially open (or non-solid) structure as well. The open walls of the annealing unit 604 and/or the heating chamber 612 can be configured to enable airflow through the annealing unit 604 to help quench a heated segment of fiber 606 during a cooling portion of the process 500. During such periods, the heating chamber 612 can be configured to turn off the heating element, so that the given fiber segment 606a is no longer being heated to the first temperature. In some embodiments, air passing through the openings 622 of the annealing unit 604 and/or the heating chamber 612 as the annealing unit 604 continues to free fall may be sufficient to rapidly cool the fiber segment 606a to a second temperature that is less than the crystallization temperature but still greater than the glass transition temperature. For example, the second temperature may be about 350° C., or about 10 to 20° C. less than the first temperature. In other embodiments, the annealing unit 604 may be configured to enable a suitable gas or liquid to flow through the open walls of the annealing unit 604 and/or the heating chamber 612 for such rapid cooling purposes.

Figure 11A:
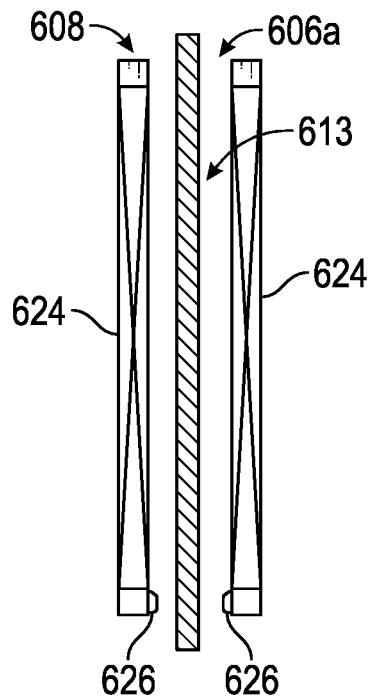
FIGS. 11A and 11B are schematic diagrams of an exemplary clamping system for securing the optical fiber within the refining system of FIG. 9, in accordance with certain embodiments.
Figure 11B:
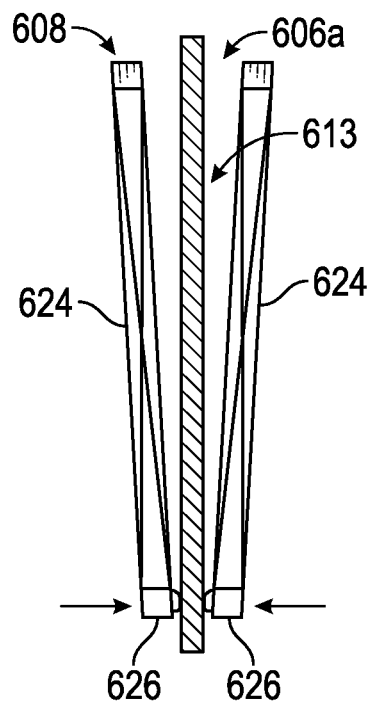

FIGS. 11A and 11B are partial close-up views of an interior portion of the annealing unit 604, with the walls of the annealing unit 604 and the heating chamber 612 removed to better illustrate the exemplary clamping system 608. As shown, the clamping system 608 comprises two moveable components 624 positioned opposite each other (or at opposites sides of the heating chamber 612) and adjacent to the hollow interior 613 of the heating chamber 612. The two components 624 are pivotably coupled to the outer wall 619 and/or the heating chamber 612 and are configured to move between an inactive position, shown in FIG. 11A, and an active position, shown in FIG. 11B. As also shown, the two moveable components 624 are positioned adjacent to the fiber segment 606a disposed within the heating chamber 612 and are configured to engage, or press against, opposites sides of the fiber segment 606a when in the active position, and leave the fiber segment 606a untouched when in the inactive position.

According to embodiments, each moveable component 624 (also referred to as an "actuator") comprises a gripping portion 626 for engaging the fiber segment 606a once the component 624 is moved to an active position. In some cases, each gripping portion 626 comprises a pad, cushion, or other suitable component for enabling the movement component 624 to press against the fiber 606 without causing damage. The gripping portions 626 may be configured to apply enough frictional force to the fiber segment 606a to keep or hold the segment 606a within the heating chamber 612 while the clamping system 608 is active. For example, in some cases, the first spool 614 and/or the second spool 616 may apply a downward force on the optical fiber 606 that is sufficient to continuously pull the fiber 606 towards the second spool 616. In such cases, the gripping portions 626 must be configured to counter said downward force, for example, by applying enough frictional force, in total, to overcome the downward force, or otherwise stopping the fiber 606 from moving or sliding towards the second spool 616. In this manner, a given fiber segment 606a can be secured (or trapped) within the heating chamber 612 and made available for processing during the active position.

By contrast, when the clamping system 608 is in the inactive or rest position, the components 624 are positioned substantially parallel to each other and the fiber 606, such that the gripping portions 626 are positioned a distance away from the fiber segment 606a to avoid contact therewith. In such rest position, the fiber 606 is free to move through the heating chamber 612 and the remainder of the annealing unit 604.

In some embodiments, the gripping portions 626 (also referred to as "grippers" or "stoppers") are located at or near a bottom end of each moveable component 624. For example, in FIG. 11A, the component 624 terminates at the gripping portion 626. In such cases, the active position may be achieved by pressing or moving the bottom end of each component 624 inwards, for example, as shown in FIG. 11B. In other embodiments, the gripping portions 626 may be located at or near the top end of each moveable component 624, in which case the gripping portions 636 may be activated by press the top end of each component 624 inwards. Other types of devices for grabbing a segment of optical fiber 606 and holding the fiber segment within the heating chamber 612 during processing are also contemplated.

In embodiments, the clamping system 608 can be configured to hold onto a single fiber segment 606a during each free falling cycle, i.e. as the annealing unit 604 travels from a top of the accelerating chamber 602 to a bottom of the chamber 602. Upon reaching the bottom, the clamping system 608 can be configured to release the given fiber segment 606a and grab a second or next segment of fiber 606. For example, if the heating chamber 612 is configured to process three inches of fiber at a time, the clamping system 608 may be configured to grasp or clamp onto the fiber 606 at three inch intervals. In this manner, the entire length of optical fiber 606 may be methodically processed or refined using the system 600.

In embodiments, the processor 618 can be configured to control one or more functions of the annealing unit 404, the accelerating chamber 402, the spools 614 and 616, and/or other component of the system 600. For example, in some embodiments, the processor 618 is electrically coupled to the first and second spools 614 and 616 to control a movement or rotation of the spools, including rotation speed and direction, similar to the processor control of spools 414 and 416. In some embodiments, the processor 618 can be electrically coupled to the clamping system 608 for controlling a movement of the moveable components 624 between the active and inactive positions.

The processor 618 may also be electrically coupled to the heating chamber 612 for controlling a temperature setting of the heating element within the chamber 612. For example, the processor 618 may set a temperature of the heating element to the first temperature during annealing, and may increase or decrease this temperature as needed to maintain the first temperature during free fall, for example, based on real time temperature readings from a sensor (e.g., thermocouple) within the chamber 412.

In some embodiments, the processor 618 may be electrically coupled to the accelerating chamber 602 in order to control a release of the annealing unit 604 at the start of a processing cycle or at the top of the chamber 602, and a deceleration and stopping of the annealing unit 604 at the end of the cycle or upon reaching the bottom of the chamber 602. For example, the accelerating chamber 602 may include a frictionless track (not shown) or other device capable of moving the annealing unit 604 up and down the accelerating chamber 602, and a braking system (not shown) capable of stopping movement of the annealing unit 604 along the track. In such cases, the processor 618 may be electrically coupled to the braking system in order to stop a motion of the annealing unit 604 at the bottom of the chamber 602 and electrically coupled to the track system for moving the annealing unit 604 in a first direction towards the bottom of the unit 604 and in a second, opposite direction towards the top of the unit 604. Other devices or systems for moving the annealing unit 604 within the accelerating chamber 602 are al so contemplated.

In some embodiments, the system 600 further includes one or more components for conducting a post-annealing analysis of the processed segment 606a to determine whether additional processing is required to obtain optimal results. In such cases, the system 600 may include one or more lasers and photodetectors, similar to those included in the annealing unit 404. Moreover, like the processor 418, the processor 618 may be electrically coupled to said components and may be configured to monitor or measure a scattering profile of the processed segment 606a (after completion of the cooling process) and determine a fiber loss value of the processed segment 606a in real time based on the measured information. The determined fiber loss value may be compared to a fiber loss threshold and if the threshold is not met, the processor 618 may send the fiber segment 606a back through the accelerating chamber 602 for additional processing. In one example embodiment, the processor 618 may continue repeating the annealing and cooling process until an optimal scattering coefficient or other fiber loss metric is achieved for a given wavelength of light (e.g., 0.1 decibels per kilometer (dB/km) at approximately 650 nm).

Referring back to FIG. 8, process 500 will now be described with reference to the components of system 600. The process 500 may be implementing using one or more processors included in the system 600, including, for example, the processor 618. As shown, the processor 500 begins at block 502 with securing a segment of optical fiber (e.g., fiber segment 606a) within an annealing unit (e.g., annealing unit 604). More specifically, the fiber segment may be secured within a heating chamber (e.g., heating chamber 612) of the annealing unit, or adjacent to a heating element of said heating chamber, using a clamping system (e.g., clamping system 608) disposed adjacent to the heating chamber. The clamping system may be configured to secure or grab a fiber segment of uniform length (e.g., three inches) for each processing cycle (e.g., annealing and cooling). At block 504, the fiber segment is heated to a first temperature that is greater than the crystallization temperature ($T_x$) of the optical fiber but lower than the molten temperature ($T_m$) of the fiber. For example, the first temperature may be about 370° C. or any other value between 352° C. and 450° C.

At block 506, the annealing unit is dropped or moved from a first or starting location of an accelerating chamber (e.g., accelerating chamber 602) to a second or ending location of the same chamber at the speed of gravity (e.g., 9.8 m/s') or using free fall motion. In embodiments, the accelerating chamber 602 is configured to maintain the free fall motion for a minimum amount of time (e.g., 320 milliseconds). At block 508, a temperature of the fiber segment is maintained at the first temperature for a first period of time during said free fall motion. At block 510, the fiber segment is cooled to a second temperature for a second period of time. The second temperature may be below the crystallization temperature ($T_x$) but above the glass transition temperature ($T_g$). In one example embodiment, the second temperature is about 350° C., or about 10 to 20° C. lower than the first temperature. The fiber processing cycle may be considered complete once the second period of time comes to an end.

According to embodiments, the second period of time (also referred to herein as the "cooling period") may begin while the fiber segment is in free fall motion, but may end after free fall motion has stopped, or while the fiber segment is in deceleration (e.g., in the third time period $t_3$ of FIG. 5). Thus, the amount of time allotted for free fall may be spent both heating and, at least partially, cooling the fiber segment. In some embodiments, the first period of time and the second period of time may be substantially equal in length. In other embodiments, the second period of time may be longer than the first period of time. As will be appreciated, the exact length of the first period of time will depend on a physical length of the fiber segment, as well as other factors, as described herein.

At block 512, the annealing unit is moved from the second location of the accelerating chamber 602 back to the first location of the chamber 602. At block 514, the one or more processors (e.g., processor 618) of the system 600 determine whether the processed fiber segment meets a fiber loss threshold stored in a memory of the unit. If the determination at block 514 is no (i.e. the threshold is not met), the process 500 moves back to block 504 to begin re-processing the fiber segments (i.e. repeat blocks 504 through 514). If the determination at block 514 is yes (i.e. the threshold is met or exceeded), the process 500 continues to block 516.

At block 516, the one or more processors determine whether subsequent fiber segments remain in the pre-anneal fiber spool (e.g., first spool 614). If the determination at block 516 is no, the process 500 ends. If the determination at block 516 is yes, the process 500 continues to block 518 where the processed fiber segment is released from the heating chamber of the annealing unit. For example, the one or more processors may cause the clamping system to release its grip on the fiber, or move to the inactive state. From block 518, the process 500 moves back to block 502 to begin processing a next segment of fiber. Thus, the process 500 may be repeated over and over until the entire length of pre-annealed fiber is sufficiently improved, or meets a target fiber loss threshold (e.g., less than 0.1 dB/km at 650 nm).

In embodiments, each of the processes 300 and 500 can be implemented, at least in part, by at least one data processor executing software stored in a memory, such as, for example, processor 418 and memory (not shown) included in the annealing unit 404 shown in FIG. 7B, or processor 618 and memory (not shown) included in the acceleration chamber 602 shown in FIG. 9. In order to carry out the operations of a given process 300/500, the processor 418/618 may interact with one or more other components of the system 400/600, respectively. The processor 418/618 can be any appropriate hardware device for executing software instructions retrieved from the memory, such as, for example, a central processing unit (CPU), a semiconductor-based microprocessor (in the form of a microchip or chip set), or another type of microprocessor.

Each processor 418/618 is communicatively coupled to a memory, which can be any appropriate memory device suitable for storing software instructions, such as, for example, a volatile memory element (e.g., random access memory (RAM, such as DRAM, SRAM, SDRAM, etc.)), a nonvolatile memory element (e.g., ROM, hard drive, tape, CDROM, etc.), or any combination thereof. Moreover, the memory may incorporate electronic, magnetic, optical, and/ or other types of storage media. In some embodiments, the memory includes a non-transitory computer readable medium for implementing all or a portion of one or more of the methods described herein and shown in FIGS. 5 and 8.

The memory can store one or more executable computer programs or software modules comprising a set of instructions to be performed, such as, for example, one or more software applications that may be executed by the processor 418/618 to carry out the principles disclosed herein (e.g., processes 300/500). The executable programs can be implemented in software, firmware, hardware, or a combination thereof.

FIG. 12 illustrates an exemplary power over fiber system 700, in accordance with embodiments. Components of the system 700 may be similar to the power over fiber system 100 shown in FIG. 3. For example, the system 700 comprises an optical source 702 that is substantially similar to the optical source 102 of FIG. 3, an optical fiber cable 704 that is substantially similar to the optical fiber cable 104 of FIG. 3, and an optical detector 706 that is substantially similar to the optical detector 106 shown in FIG. 3. In some embodiments, like the cable 104, the optical fiber cable 704 may have a first end 708 coupled to the optical source 702, a second end 710 coupled to the optical detector 706, and a plurality of optical fibers that extend the length of the cable 704, i.e. the full length between the first end 708 and the second end 710, for example, substantially similar to the ZBLAN optical fibers 202 shown in FIG. 4. For the sake of brevity, the optical detector 706, optical source 702 (also referred to as a "laser source"), and optical fiber cable 704 will not be described in great detail here in light of these similarities.

In embodiments, the power over fiber system 700 can be used or included in an optical fiber network for supplying power to various loads, each load connected to, or including, an optical to electrical converter. For example, the optical fiber network may terminate at various pieces of machinery and equipment in industrial applications, or at various electronics and other devices that are powered using standard wall outlets in residential or commercial applications. One example of such a network may be the optical power distribution system 800 shown in FIG. 13.

In some embodiments, the optical fiber cable 704 may be coupled to the optical source 702 and/or the optical detector 706 via respective fiber optic couplers or connectors 712 and 714 and fiber optic splices 716 and 717 (e.g., mechanical splice, fusion splice, or any other suitable type of splicing device). For example, as shown in FIG. 12, the first end 708 of the cable 704 may be coupled to a first splice 716, which may be connected to a first connector 712 via a second optical fiber cable 713 that is similar to the optical fiber cable 704. The first connector 712 is also coupled to the optical source 702 and is configured to pass or transmit optical energy or power from the optical source 702 to the optical fiber cables 713 and/or 704. Likewise, the second end 710 of the cable 704 may be coupled to a second splice 717, which may be connected to a second connector 714 via a third optical fiber cable 715 that is similar to the optical fiber cable 704. The second connector 714 is also coupled to the optical detector 706 and is configured to pass the optical power received via the optical fiber cables 715 and/or 704 to the optical detector 706. As will be appreciated, additional splices 716 may be included if more optical fiber cables are joined together in order to deliver power across the power over fiber system 700.

As shown in FIG. 12, the optical source 702 is included in a transmit unit 718 (also referred to herein as an electrical to optical ("E-O") conversion unit) and is configured to convert electrical energy into optical energy (e.g., high power laser energy) for transmission over the optical fiber cable 704 (like the optical source 102 of FIG. 1). In embodiments, the electrical energy is electric power received from an external power source (e.g., DC power supply, AC power supply, etc.) coupled to the transmit unit 718. The transmit unit 718 also includes a driver 720 (e.g., laser diode driver) coupled between the power source and the optical source 702 for driving operation of the optical source 702 (e.g., laser diode) with the electrical power signal received from the power source (or other power input). In some embodiments, the transmit unit 718 may be coupled to an external control device (e.g., power control unit 836 shown in FIG. 13) that serves as an intermediary between the transmit unit 718 and the external power source. In such cases, the external control device may manage the amount of power being supplied to the transmit unit 718 and control other operational aspects of the unit 718, for example, in accordance with method 900 of FIG. 14.

As shown in FIG. 12, the optical detector 706 is included in a receive unit 722 (also referred to herein as an optical to electrical ("O-E") conversion unit) and is configured to convert the optical energy (or power) received via the optical fiber cable 704 into electrical energy (or power). In embodiments, the electrical energy is used to power one or more electric loads coupled to the receive unit 722 (e.g., as shown in FIG. 13).

In embodiments, the receive unit 722 is also configured to send control signals, status signals, feedback signals, and/or other data signals to the transmit unit 718 via the same optical fiber cable 704 coupled therebetween. The information contained in such data signals may be received from the one or more electric loads coupled to the receive unit 722 (e.g., as described with respect to FIG. 13), or from a control unit (not shown) coupled to multiple electric loads. In such embodiments, the optical fiber cable 704 may include, or may be coupled to, one or more optical circulators (not shown) for enabling bi-directional transmission of optical signals over the cable 704 as a whole, or over one or more of the individual fibers included in the cable 704.

As shown, the receive unit 722 can further comprise a first processor 724 (e.g., microprocessor, microcontroller, or the like) configured to generate one or more digital data signals based on the received information. The receive unit 722 can also include an optical transmitter 726 coupled to the first processor 724 and the optical fiber cable 704. The optical transmitter 726 can be configured to convert the digital data signal into an optical data signal, or other signal capable of being transmitted over the optical fiber cable 704. The optical transmitter 726 can be further configured to provide the optical data signal to the optical fiber cable 704 for transmission to the transmit unit 718. The optical transmitter 726 may be a laser diode (or diode laser) or any other optical device capable of transmitting the optical data signal over the optical fiber cable 704. In some embodiments, the optical transmitter 726 is a laser diode included in the photodiode package of the optical detector 706.

Likewise, the transmit unit 718 can further comprise an optical receiver 728 coupled to the optical fiber cable 704 and a second processor 730 (e.g., microprocessor, microcontroller, or the like) also included in the transmit unit 718. The optical receiver 728 can be configured to receive the optical data signal transmitted over the optical fiber cable 704 and convert the received signal back to digital form. The optical receiver 728 may be a photodiode or other optical device capable of monitoring the optical cavity of the laser diode 702 for the optical data signal. In some embodiments, the optical receiver 728 is a monitor diode integrated into the laser diode package of the optical source 702. The optical receiver 728 can provide the digital data signal to the second processor 730 for processing, for example, as described with respect to FIG. 13. In embodiments, the second processor 730 may provide the data extracted from the optical data signal to an external device, such as, for example, a controller or control unit of the external power source (e.g., as shown in FIG. 13).

Referring now to FIG. 13, shown is an exemplary optical power distribution system 800 that uses the optical fiber cable described herein (e.g., as shown in FIG. 4) as transmission lines for transporting optical power, in the form of high power laser energy, to multiple locations or loads, in accordance with embodiments. The optical power distribution system 800 may be used to distribute power in any industrial, commercial, residential, or personal setting, including, for example, within an airplane, automobile, or home; across great distances (e.g., between continents, countries, cities, etc.); and/or in highly volatile areas, for example, where electrical power distribution may be risky.

In embodiments, the optical power distribution system 800 can include an n number of power over fiber systems 801, each of which is substantially similar to the power over fiber system 700 shown in FIG. 12. For example, as shown in FIG. 13, the system 800 can comprise a plurality of electrical to optical ("E-O") conversion units 818, a plurality of optical to electrical ("O-E") conversion units 820, and a plurality of optical fiber cables 804, wherein each E-O unit 818 is substantially similar to the transmit unit 718 of FIG. 12, each O-E unit 822 is substantially similar to the receive unit 722 of FIG. 12, and each optical fiber cable 804 is substantially similar to the optical fiber cable 704 of FIG. 12. Moreover, each E-O unit 818 can be coupled to a respective one of the O-E units 822 via a corresponding optical fiber cable 804 and can be configured to transmit optical power ("OPP") to the respective O-E unit 822 over said cable 804, as in the power over fiber system 700. Given these similarities with FIG. 12, the E-O units 818, O-E units 822, and optical fiber cables 804 will not be described in great detail here for the sake of brevity.

As shown in FIG. 13, each power over fiber system 801 can be coupled to a respective one of a plurality of electric loads 832 and to a common power source 834. In addition, each of the plurality of E-O units 818 can be coupled to a power control unit 836 (or power controller) that is electrically connected to the power source 834. The power source 834 may be any type of electric power supply (e.g., DC or AC) or any other device capable of generating enough power to support the electric loads 832. The power control unit 836 (also referred to as a "master power control unit") can manage distribution or transmission of the power generated by the power source 834 to the E-O units 818 and control various other aspects of the power distribution system 800, as described herein. While FIG. 13 illustrates a single power source 834 for generating electric power and a single power control unit 836 coupled thereto, in other embodiments the system 800 may include multiple power sources and/or multiple control units coupled to the plurality of E-O units 818.

According to embodiments, the power control unit 836 can be configured to control operation of the power source 834 (e.g., turn on or off, increase or decrease amount of power generated, etc.), control operation of each E-O unit 818 (e.g., turn on or off, etc.), manage electrical power distribution to individual E-O units 818, and/or control other aspects of the power distribution system 800. In some cases, the power control unit 836 manages power distribution by distributing the generated power evenly among all of the E-O units 818. In other cases, the power control unit 836 is configured to optimize the distribution of generated power among the E-O units 818 based on the electric load 832 coupled to each E-O unit 818.

For example, the power control unit 836 may adjust or control the optical power distributed to a given O-E unit 822 according to a power rating or requirement of the corresponding electric load 832 (i.e. the load 832 that is electrically connected to that O-E unit 822), or other status information received from the load 832. In such cases, the power control unit 836 determines a power requirement of each electric load 832 based on data provided by the electric loads 832, and controls one or more characteristics of the optical power output by each corresponding E-O unit 818 accordingly, so that the electrical power ultimately received at the corresponding electric load 832 matches or complies with the power requirement of that load 832.

The electric loads 832 may be any type of device or system requiring electrical power, including, for example, a home or building, an electronic device, a power station, a vehicle, and others. Each electric load 832 may be electrically coupled to a respective O-E unit 822 using a wired connection (e.g., electric cable or the like) or a wireless connection (e.g., a wireless power transfer system). In embodiments, each electric load 832 can be configured to send data to the O-E unit 822 connected to that load 832, for example, using the same wired or wireless connection, or a separate link or connection for data transmission. The data may include status information, connection information, power requirement information, and/or any other information pertinent to managing power delivery. The status information may include a power factor of the electric load 832 (or ratio of real power to apparent power), power utilization or other measurement for indicating an energy efficiency of the load 832, as well as any other information related to an operation or status of the load 832, for example. The connection information may include a connection validator or other indication that the load 832 is connected to, and/or receiving power from, the O-E unit 822, as well as other information pertaining to the electrical connection between the load 832 and the O-E unit 822, for example. The power requirement information may include a power rating of the electric load 832, or an amount of power required to operate, or otherwise support, the load 832, as well as other information relevant to the power-related needs of the load 832, for example.

Referring additionally to FIG. 12, the O-E units 822 can be configured to receive the data provided by the electric loads 832 and process the received data using individual processors (e.g., processor 724 of FIG. 12) or other computing devices included in the units 822. The O-E processor can be further configured to generate a data signal (or digital data signal) based on the received data and provide the data signal to an optical transmitter (e.g., optical transmitter 726 of FIG. 12) for transmitting the data to the E-O unit 818. As described with respect to FIG. 12, the optical transmitter may convert the digital data signal into an optical data signal (also referred to herein as an optical status signal ("OSS")) suitable for transmission over the optical fiber cable 804, as shown in FIG. 13.

In embodiments, the power control unit 836 can be configured to analyze each data signal (or "OSS") received from the E-O units 818 to determine whether the optical power provided to each electric load 832 meets the power requirement of that load 832, or otherwise identify any power or load shedding needs of the system 800. For example, if a given electric load 832 requires more than the currently-supplied optical power (or "OPP"), the power control unit 836 can determine whether additional optical power can be supplied to the corresponding O-E unit 822 by increasing the number of optical fibers within the optical fiber cable 804 that are used to transmit optical power to that O-E unit 822. Additionally, or alternatively, the power control unit 836 can determine whether the power source 834 can supply more generated power to the corresponding E-O unit 818, so as to increase the overall amount of power available to the load 832. In other cases, the power control unit 836 may control or adjust other characteristics of the E-O units 818, and/or the optical power transmitted therefrom, in order to increase the amount of power delivered to the load 832. In any case, if additional power is available, the power control unit 836 can control the E-O units 818 and/or power source 834 to ensure that additional power is delivered to each electric load 832 as needed.

If additional power is not available, for example, because all of the optical fibers of the optical fiber cable 804 are already in use and the power source 834 is already operating at maximum capacity, the power control unit 836 may determine that the power source 834 cannot accommodate the power requirement of the given electric load 832, and may terminate the optical link between the corresponding E-O unit 818 and O-E unit 822 as a result. For example, the power control unit 836 may turn off the optical source included in the corresponding E-O unit 818, or otherwise stop transmitting optical power over the optical fiber cable 804 coupled thereto.

In some embodiments, the power control unit 836 can be configured to use similar techniques as those described herein when the load 832 requires less than the supplied amount of power. For example, the power control unit 836 may decrease the number of optical fibers being used, reduce the amount of generated power being supplied by the power source 834 to the laser source of the E-O unit 818, reduce the amount of optical power being output by the E-O unit 818, and/or control one or more other characteristics of the E-O unit 818 and/or the optical fiber cable 804.

Figure 14:
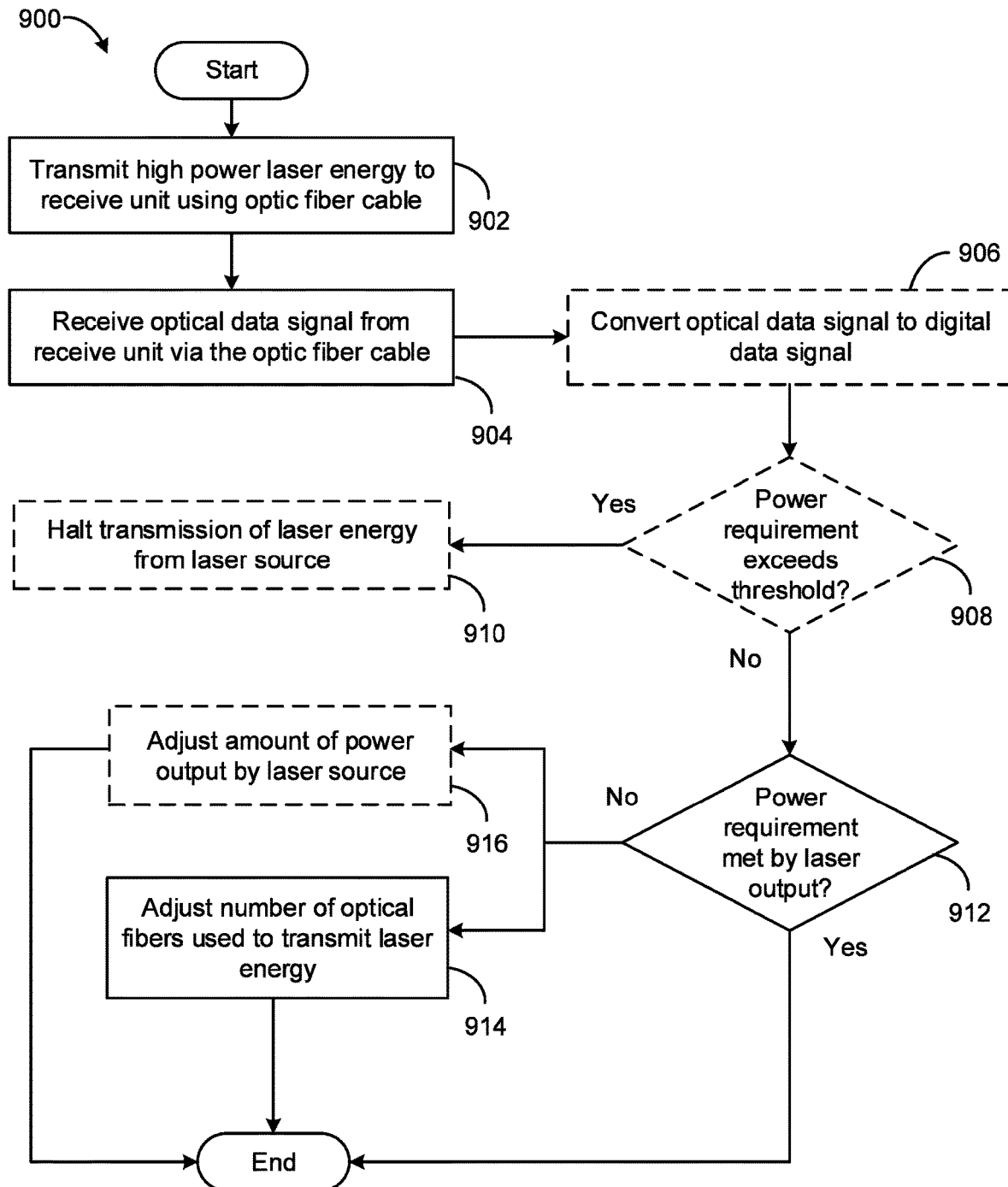
FIG. 14 is a flow diagram of an exemplary method of managing power transmission in a power over fiber system, in accordance with certain embodiments.

Thus, the system 800 can be configured to match the power requirements of each load 832 and thereby, avoid grid inefficiency, but also use power shedding techniques to prevent charge build up and ensure efficient utilization of the O-E/E-O infrastructure, as further described herein with respect to method 900 of FIG. 14.

The power control unit 836 can comprise one or more appropriate hardware devices for carrying out the operations described herein, such as, for example, a processing device (or processor) and a memory device. The processor can be any appropriate hardware device for executing software instructions retrieved from the memory device, such as, for example, a central processing unit (CPU), a semiconductor-based microprocessor (in the form of a microchip or chip set), or another type of microprocessor.

The memory device can be any appropriate memory device suitable for storing software instructions, such as, for example, a volatile memory element (e.g., random access memory (RAM, such as DRAM, SRAM, SDRAM, etc.), a nonvolatile memory element (e.g., ROM, hard drive, tape, CDROM, etc.), or any combination thereof. Moreover, the memory device may incorporate electronic, magnetic, optical, and/or other types of storage media. In some embodiments, the memory includes a non-transitory computer readable medium for implementing all or a portion of one or more of the method described herein and shown in FIG. 14. The memory can store one or more executable computer programs or software modules comprising a set of instructions to be performed, such as, for example, one or more software applications that may be executed by the processor to carry out the principles disclosed herein (e.g., process 900). The executable programs can be implemented in software, firmware, hardware, or a combination thereof.

FIG. 14 illustrates an exemplary process or method 900 of managing power delivery in a power over fiber system, wherein the power over fiber system comprises a transmit unit having a laser source, a receive unit having an optical detector, and an optical fiber cable coupled between the units, in accordance with embodiments. In some embodiments, the power over fiber system may be substantially similar to any of the power over fiber systems described herein, such as, for example, the power over fiber system 700 shown in FIG. 12. In some embodiments, the power over fiber system may be an optical power distribution system, such as, for example, the optical power distribution system 800 shown in FIG. 13, or may form part of a larger optical power distribution system (e.g., similar to the power over fiber system 801 of FIG. 13).

The method 900 can be carried out by one or more electronic devices or components of the power over fiber system, alone or in combination with one or more other electronic devices. Said devices may include, for example, the power control unit 836 shown in FIG. 13, the transmit unit 718 shown in FIG. 12, and/or the receive unit 722 shown in FIG. 12. The functionalities of the method 900 can be implemented, at least in part, by a processor of the device (e.g., a processor of the power control unit 836 and/or the processors 724 and 730 of FIG. 12) executing a software application stored in a memory of the device. In some embodiments, the application may be a computer program stored on a non-transitory computer readable medium that is executable by a processor of the device. To further carry out the operations of the method 900, the electronic device(s) can interact or interface with one or more external devices or components coupled thereto, such as, for example, an external power source (e.g., power source 834 of FIG. 13) and an external electric load (e.g., electric loads 832 of FIG. 13), as well as employ one or more internal devices (e.g., laser source 702 and optical receiver 728 of the transmit unit, optical detector 706 and optical transmitter 726 of the receive unit 722, etc.). In some embodiments, the method 900 may be carried out by the power control unit 836 in order to manage power delivery within each power over fiber system 801 included in the optical power distribution system 800.

As shown in FIG. 14, the method 902 can begin at step 902, which includes transmitting high power laser energy from the transmit unit to the receive unit using a first number, n, of the optical fibers included in the optical fiber cable. In embodiments, the optical fiber cable comprises a plurality of optical fibers, wherein each fiber extends the length of the optical fiber cable and is surrounded by a thermal filler. For example, the optical fiber cable may be substantially similar to the optical fiber cable 200 shown in FIG. 4 and comprised of optical fibers 202, or any other optical fiber cable capable of transmitting laser energy having a power of about one gigawatt over a distance of about 1000 kilometers (km) with a loss of about 0.1 decibels (dB). In such embodiments, the transmit unit can use all, some, or any other number of the optical fibers in the optical fiber cable to transmit optical power to the receive unit. In some embodiments, the transmit unit is configured to initially use a first number of the optical fibers, the first number being selected based on a preset value (e.g., one fiber, 50% of the fibers, etc.). In other embodiments, the first number of optical fibers can be selected by a user or operator of the system.

Step 904 of method 900 includes receiving, at a processor, a data signal comprising information pertaining to a power requirement of an electric load coupled to the receive unit, wherein the data signal is transmitted from the receive unit to the transmit unit using the same optical fiber cable used to transmit the high power laser energy. The power requirement information may include, for example, a power rating of the electric load or other indication of an amount of power required to operate the electric load. In some embodiments, the data signal may include additional information as well, such as, for example, connection information confirming power delivery to the electric load, status information indicating a power factor or power utilization of the electric load, or other indication of an amount of power being used by, or received at, the load, feedback information comprising a message from the electric load and/or receive unit, and/or other information described herein.

According to embodiments, the data signal is an optical data signal generated by an optical transmitter included in the receive unit (e.g., optical transmitter 726 of FIG. 12) and transmitted over the optical fiber cable. In such embodiments, step 904 further comprises receiving the optical data signal at an optical receiver included in the transmit unit (e.g., optical receiver 728 of FIG. 12). At step 906, the optical data signal is converted into a digital data signal, for example, using the optical receiver (e.g., a monitor diode), and provided to the processor.

In embodiments, the method 900 further comprises analyzing the data signal using the processor, and controlling the high power laser energy output by the transmit unit based on said analysis. For example, if the data signal includes power requirement information for the electric load, the method 900 includes controlling the high power laser energy output by the transmit unit based on the power requirement of the electric load. In various embodiments, the method 900 includes adjusting or controlling one or more characteristics of the transmit unit and/or the optical fiber cable in order to control the high power laser energy output.

More specifically, analysis of the data signal may include, at step 908, identifying the power requirement information included in the data signal, and determining whether the power requirement included in the data signal exceeds a threshold amount of power. In some embodiments, the threshold amount of power may be associated with an external power source coupled to the transmit unit (e.g., power source 834 of FIG. 13), such as, for example, a maximum amount of electric power that can be generated by the external power source, or other threshold value of the external power source. In other embodiments, the threshold amount of power may be associated with the optical source (e.g., laser source) of the transmit unit, such as, for example, a maximum amount of optical power that can be output by the laser, other threshold value of the optical source. In still other embodiments, the threshold amount of power may be associated with the optical fiber cable, such as, for example, a maximum amount of power that can be carried by the cable across the entire length of the cable, or other threshold value of the optical fiber cable. Other threshold amounts associated with the power over fiber system are also contemplated.

If the determination at step 908 is positive, i.e. the power requirement of the electric load exceeds the threshold amount of power, the method 900 continues to step 910, which includes controlling the high power laser energy output transmitted by the transmit unit by halting the transmission of high power laser energy from the transmit unit. That is, the power over fiber system will halt operation of the optical source or otherwise stop supplying optical power over the optical fiber cable if the power required to operate the electric load is greater than the available amount of power.

If the determination at step 908 is negative, i.e. the power requirement does not exceed the threshold, the method 900 continues to step 912, which includes determining whether the power requirement of the electric load is met by the high power laser energy being output by the transmit unit, or received at the receive unit. For example, the processor may compare the amount of optical power that is detected by the receive unit with the amount of power required to operate the electric load to determine if there is a gap or shortage at the receiving end. If the determination at step 912 is positive, i.e. the power requirement of the electric load is being met, the method 900 may end.

If, on the other hand, the determination at step 912 is negative, i.e. the power requirement is not met by the received laser energy, the method 900 can include controlling or adjusting the high power laser energy output by the transmit unit so that the power requirement is met, or otherwise tailoring the laser output to meet the needs of the corresponding electric load. Exactly how the laser energy output of the transmit unit is tailored will vary depending on a variety of factors, including, for example, the power requirement of the electric load, the total number of optical fibers included in the optical fiber cable, the power characteristics of the laser source, and the maximum power capacity of each fiber.

In some embodiments, said adjustment may be achieved at step 914 by adjusting the number of optical fibers used to transmit the laser energy from the transmit unit, based on the power requirement of the electric load, so as to control a form of the optical power (OPP) being transmitted over the optical fiber cable. For example, in some cases, the transmit unit may increase the first number of optical fibers that were initially used to transmit laser energy to a second number of optical fibers that is greater than the first number. In other cases, the transmit unit may decrease the number of optical fibers being used to a third number that is less than the first number in order to reduce the amount of optical power being transmitted to the receiving end. Accordingly, step 914 may further include determining, using the processor, the number of optical fibers that are needed to meet the power requirement of the electric load, and instructing the transmit unit (or the laser source included therein) to use the determined number of optical fibers for optical power transmission to the receive unit.

In some cases, adjustment of the laser energy output at step 916 may be achieved by adjusting not only the number of optical fibers but also, the amount of power that is transmitted over each optical fiber. As an example, initially, each optical fiber in the first number of fibers may be operated at about 75% of the fiber's maximum power capacity (e.g., about 10 kilowatts (kW)). If more power is required, one or more of those fibers may be operated at a higher capacity (e.g., 80%), or an additional fiber may be used, but only up to the capacity that is needed to meet the power requirement. Likewise, if less power is required, the total power output may be reduced by controlling or decreasing the amount of optical power that is transmitted over one or more of the fibers.

In some cases, adjustment of the laser energy output, or a form of the optical power, may be achieved at step 916 by adjusting the amount of power that is output by the laser source according to the power requirement of the electric load. For example, a power setting of the laser source, or an optical power conversion setting of the overall transmit unit, may be increased or adjusted from a first setting to a second setting in order to increase the amount of optical power that is transmitted to the receive unit. As another example, in embodiments where the laser source is a diode array comprised of a plurality of laser diodes, the laser energy output of the laser source may be adjusted by controlling the number of laser diodes that are being used to output the optical power. For example, the transmit unit may be configured to turn on or turn off one or more of the laser diodes in the array depending on the amount of power needed to meet the power requirement of the electric load.

In some cases, a combination of steps 914 and 916 may be used to meet the power requirement of the electric load. For example, if the power requirement of the electric load is not met by using all of the optical fibers in the optical fiber cable, the amount of optical power output by the laser source may be increased as well, up to a maximum power capacity of each fiber. In some cases, the high power laser energy output by the transmit unit is controlled or adjusted based on the power requirement of the electric load by both increasing the amount of optical power output by the laser source and increasing the number of optical fibers used to transmit the laser energy from the first number of fibers to a second number of fibers that is equal to the total number of optical fibers included in the optical fiber cable.

In some embodiments, the laser energy output by the transmit unit can be adjusted on a temporal basis, or for only a set period of time, for example, in order to meet peak load demand (e.g., during daytime hours) or other temporal needs of the power over fiber system. For example, step 914 may further comprise increasing the number of optical fibers used from the first number to the second number at a first point in time ( ), and decreasing the number of optical fibers back to the first number at a second point in time, or after the set period of time has passed. Likewise, step 916 may further comprise, at a first point in time, increasing the amount of optical power being output by the laser source by changing a first setting to a second setting, and at a second point in time, or after passage of a certain time period, reverting back to the first setting in order to decrease the amount of optical power being output by the laser source. Other techniques for temporarily adjusting the form of the optical power being transported over the optic fiber cable may also be used, as will be appreciated.

FIG. 15 illustrates an exemplary power over fiber system 1000 configured for use in medical applications, in accordance with embodiments. In some embodiments, the power over fiber system 1000 can be used to remove or ablate tumors or other undesirable objects located in a human body without extensive surgery. As an example, the power over fiber system 100 may be used for laser-induced thermal therapy, percutaneous laser ablation of certain tumors (e.g., primary and secondary malignant lung tumors, and the like), as well as other appropriate medical procedures (e.g., ureteral stone removal, etc.). Like the other power over fiber systems described herein, the power over fiber system 1000 can tailor its laser energy output according to the needs of the receiving end, or in this case, the particular medical procedure being performed, even as those needs change throughout the procedure. For example, when used to ablate or eliminate an undesired object in a patient's body, the system 1000 can be configured to adjust one or more characteristics of the laser energy output as the size and/or shape of the object changes in response to the laser treatment. As a result, the power over fiber system 1000 can provide a more efficient and precise ablation technique than existing laser-induced thermal therapy techniques and the like.

As shown in FIG. 15, the system 1000 comprises an optical source 1002 (or laser source) for emitting ultra-high power laser energy, similar to the optical source 102 shown in FIG. 3. The system 1000 further comprises at least one optical fiber 1004 coupled to the laser source 1002 at a first end. During an ablation procedure, a second end of the at least one optical fiber 1004 may be inserted into a body area of a patient 1006 that is adjacent to an object 1008 to be removed or ablated. The optical fiber 1004 can serve as a transmission line for directing high power laser energy from the laser source 1002 towards the object 1008. Once the procedure is complete, all or a portion of the optical fiber 1004 may be removed from the patient's body and disposed.

In general, the laser energy emitted over the optical fiber 1004 may be tailored or optimized for achieving ablation of the particular object 1008. For example, the high power laser energy output by the laser source 1002 may be configured to have a wavelength of about 2 to 3 micrometers (μm), or other appropriate wavelength, depending on the object 1042 to be ablated. For example, the wavelength may be set to 2.1 μm for tumor ablation and 2.0 μm for ablation of ureteral stones. In some embodiments, the laser source 1002 can be configured to emit pulses of laser energy at a specific rate depending on the type of medical procedure and/or object 1008. For example, the laser source 1002 may be configured to send pulses of laser energy at a repetition rate of 50 Hertz (Hz) when dusting ureteral stones. In addition, the laser source 1002 can be configured to transmit pulses of light energy having a specific amount of power (e.g., at a pulse power of about 1 Joule (J) per pulse) depending on the particular medical application.

In embodiments, the laser energy output is adjusted during the ablation procedure in order to tailor the high power laser energy according to not only the particular type of object 1008, but also a changing physical structure of the object 1008 as ablation occurs. For example, an intensity of the laser energy being directed towards the object 1008 may be reduced as the object 1008 becomes smaller in size and/or breaks up into multiple smaller pieces. In embodiments, such tailoring can be achieved by controlling one or more characteristics or properties of the laser energy output, such as, for example, a power level of the laser energy output by the laser source 1002. In some cases, such tailoring may initially occur before the procedure begins, for example, based on information obtained about an initial size and/or shape of the object 1008, and may continue to occur during the procedure based on status or feedback information pertaining to the object 1008, or what remains of it.

To that end, the power over fiber system 1000 further includes a spectrometer 1010 coupled to a second optical fiber 1012 having a distal end located within the body of the patient 1006, at or near the same location as the first optical fiber 1004 (i.e. adjacent to the object 1008). The second optical fiber 1012 can be configured to transport light energy detected at the location of the object 1008 back to the spectrometer 1010. In embodiments, the second optical fiber 1012 may be substantially similar to one of the optical fibers 202 shown in FIG. 4. The spectrometer 1010 may be a near infrared (or "NIR) spectrometer or other optical spectrometry device capable of analyzing or measuring various properties of the returned light (or light pulses) and determining a status of the object 1008, or other incident object, based on said analysis. For example, after an initial application of laser energy, the spectrometer 1010 can measure an intensity of the returned light and otherwise analyze a spectral signature of the returned pulses, to determine whether the laser energy output ablated the object 1008 entirely or ablated only a portion of the object 1008 and/or caused the object 1008 to sever into multiple smaller pieces. The spectrometer 1010 can also analyze the signatures of the returned pulses to determine a size of the remaining pieces of the object 1008. In some cases, the spectrometer 1010 is configured to analyze the returned light by identifying a signature of each returned pulse and comparing said signatures to a previously-obtained signature of the object 1008, or other prior information, to determine how much of the original object 1008 remains, if any. The spectrometer 1010 can also monitor the signatures of the returned pulses to evaluate the effectiveness or thoroughness of the ablation procedure, including tissue morphology and absorption characteristics. The spectrometer 1010 may identify and analyze the different colors of light included in the returned pulses and a spectral structure of the returned pulses in order to make these determinations, as will be appreciated.

The power over fiber system 1000 further includes a control unit 1014 for adjusting at least one characteristic of the laser energy output based on the status information determined by the spectrometer 1012. In embodiments, the control unit 1014 can control one or more properties of the power over fiber system 1000 that are capable of impacting an intensity of the laser energy directed towards the object 1008. For example, the control unit 1014 can be configured to adjust the amount of optical power or energy emitted from the optical source 1002. As another example, the control unit 1014 can be configured to adjust a shape of the laser energy pulses that are incident on the object 1008, or otherwise change or affect one or more properties of the optical fiber 1004 that is used to transport the laser energy towards the patient 1006, as described herein with respect to FIG. 16.

As shown in FIG. 15, in some embodiments, the control unit 1014 is a standalone computing device that is communication with both the spectrometer 1012 and the laser source 1002, via a wired or wireless connection. In other embodiments, the control unit 1014 may be a microcontroller or the like that is included within the spectrometer 1012, in which case the spectrometer 1012 may be in direct communication with the laser source 1002. Regardless, the control unit 1014 may comprise a processor and memory (e.g., similar to those of the receive unit 722 shown in FIG. 12) for carrying out the operations described herein, as will be appreciated.

Figure 16:
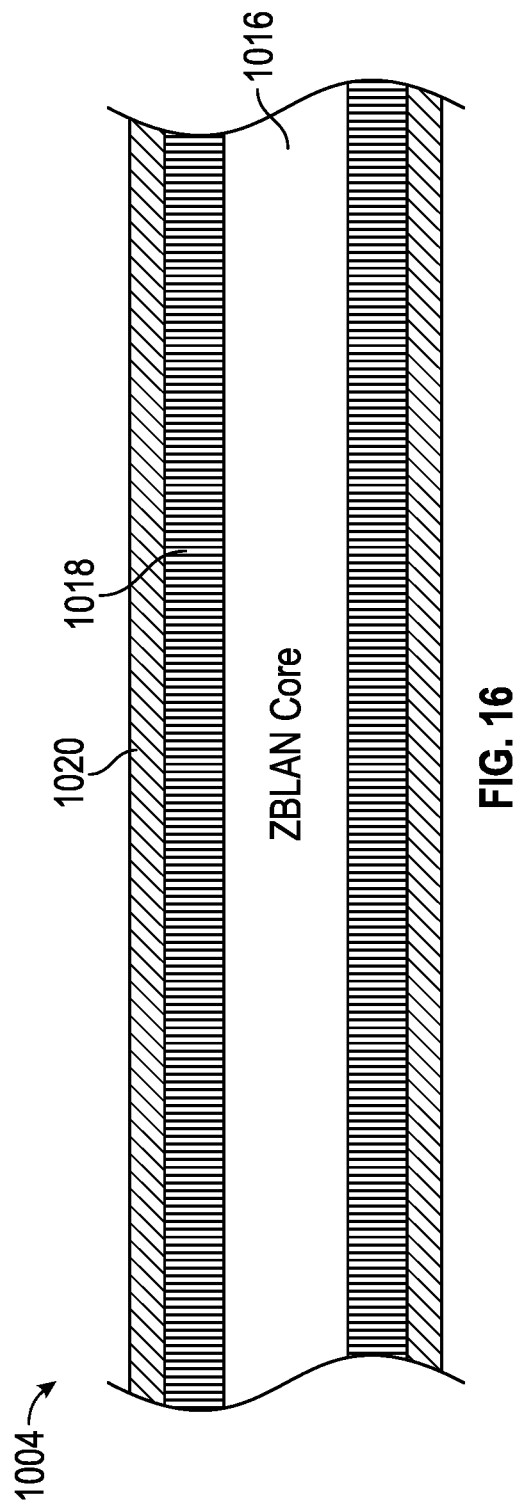
FIG. 16 is a schematic diagram illustrating a cross-sectional view of an exemplary optical fiber included in the system of FIG. 15, in accordance with certain embodiments.

Referring additionally to FIG. 16, shown is a cross-sectional view of the optical fiber 1004 included in the power over fiber system 1000 of FIG. 15. In embodiments, the optical fiber 1004 can be configured to enable control of the pulse shape and/or other properties of the laser energy being delivered via the optical fiber 1004. As shown, the optical fiber 1004 comprises a ZBLAN core 1016, which may be substantially similar to the fiber core 212 shown in FIG. 4 and described herein. The optical fiber 1004 further comprises a cladding 1018 disposed around the ZBLAN core 1016. The cladding 1018 may be fused or bonded to the core 1016, like the cladding 214 of FIG. 4. The optical fiber cable 1004 further comprises a protective coating 1020 configured to protect and insulate the ZBLAN fiber core 1016 and cladding 1018. The coating 1020 may be comprised of Polyvinyl Fluoride ("PVF") or other suitable polymer.

In embodiments, the cladding 1018 and coating 1020 can be configured to enable specific control or adjustment of one or more properties of the laser energy traveling through the core 1016 of the optical fiber 1004. For example, the cladding 1018 may have a periodic structure configured to guide or direct propagation of the laser energy towards the object 1008. The coating 1020 may be an electroactive polymer that can change in size or shape when stimulated by an electric field, such as, e.g., an electric field applied to the cladding 1018 by the control unit 1014 of FIG. 15. As the coating 1020 expands and/or contracts in response to the electric field, a period of the periodic structured cladding 1018 changes as well. This causes a corresponding change in the pulse shape of the laser energy traveling through the core 1016, as well as the amplitude or intensity of each light pulse, thus controlling the type of light that can pass through the optical fiber 1004. In embodiments, the control unit 1014 can be configured to apply a specific electric field to the cladding 1018 such that the pulse shape and intensity level of the laser energy incident on the object 1008 is tailored as needed, or according to a current status of the object 1008 (e.g., number and size of remaining pieces, etc.).

In some embodiments, the type of optical source 1002 included in the power over fiber system 1000 may be changed or modified depending on the particular medical procedure. For example, a Ho:YAG laser may be used for dusting ureteral stones, as is standard for such a surgical procedure.

In certain embodiments, the process descriptions or blocks in the figures, such as FIGS. 6, 8, and 14, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A power over fiber system, comprising:
   a laser source configured to emit high power laser energy;
   an optical detector configured to convert detected light into electrical energy; and
   an optical fiber cable comprising:
   a first end coupled to the laser source,
   an opposing second end coupled to the optical detector,
   a length extending between the first and second ends, and
   a plurality of optical fibers, each optical fiber extending the length of the cable, and having a thermal filler surrounding the fiber.

2. The power over fiber system of claim 1, wherein the laser source comprises one or more laser diode bars operating at a wavelength of approximately 2.1 µm.

3. The power over fiber system of claim 1, wherein the optical detector comprises at least one photodiode detector.

4. The power over fiber system of claim 1, wherein each optical fiber comprises $ZrF_4$—$BaF_2$—$LaF_3$—$AlF_3$—$NaF$ (ZBLAN).

5. The power over fiber system of claim 1, wherein the optical fiber cable is capable of transmitting laser energy having a power of about one gigawatt over a distance of about 1000 kilometers (km) with a loss of about 0.1 decibels (dB).

6. The power over fiber system of claim 1, further comprising:
an optical transmitter coupled to the second end of the optical fiber cable and configured to transmit a data signal; and
an optical receiver coupled to the first end of the optical fiber cable and configured to receive the data signal.

7. The power over fiber system of claim 6, wherein the optical detector is configured to provide the electrical energy to an electric load, and the data signal comprises information pertaining to a power requirement of the electric load.

8. The power over fiber system of claim 7, further comprising a power control unit configured to control an amount of power supplied by the laser source based on the data signal.

9. The power over fiber system of claim 8, wherein the power control unit is configured to turn off the laser source if the power requirement exceeds a threshold amount of power.

10. The power over fiber system of claim 8, wherein the power control unit is configured to determine a number of the plurality of optical fibers required to meet the power requirement, and deliver laser energy from the laser source to the optical detector using said number of optical fibers.

11. The power over fiber system of claim 8, wherein the power control unit is coupled to an external power source configured to supply electric power to the laser source.

12. A method of managing power delivery in a power over fiber system comprising a transmit unit having a laser source, a receive unit having an optical detector, and an optical fiber cable coupled between the units and comprising a plurality of optical fibers, each fiber extending the length of the optical fiber cable, the method comprising:
transmitting high power laser energy from the transmit unit to the receive unit using a number of the optical fibers included in the optical fiber cable;
receiving, at a processor, a data signal comprising information pertaining to a power requirement of an electric load coupled to the receive unit, the data signal being transmitted from the receive unit to the transmit unit using the optical fiber cable; and
controlling, using the processor, the high power laser energy output by the transmit unit by adjusting the number of optical fibers used to transmit the laser energy based on the power requirement of the electric load.

13. The method of claim 12, wherein controlling the high power laser energy output by the transmit unit further comprises halting transmission of the high power laser energy if the power requirement of the electric load exceeds a threshold amount of power associated with an external power source coupled to the transmit unit.

14. The method of claim 12, wherein controlling the high power laser energy output by the transmit unit further comprises adjusting an amount of power output by the laser source according to the power requirement of the electric load.

15. The method of claim 12, wherein the data signal further comprises information confirming power delivery to the electric load.

16. The method of claim 12, wherein the data signal is an optical data signal generated by an optical transmitter included in the receive unit and transmitted over the optical fiber cable, and wherein the step of receiving the data signal comprises receiving the optical data signal at an optical receiver included in the transmit unit, the method further comprising: converting the optical data signal into a digital data signal.

17. The method of claim 12, wherein each optical fiber is surrounded by a thermal filler.

18. The method of claim 12, wherein the optical detector comprises at least one photodiode detector.

19. The method of claim 12, wherein the optical fiber cable is capable of transmitting laser energy having a power of about one gigawatt over a distance of about 1000 kilometers (km) with a loss of about 0.1 decibels (dB).

20. The method of claim 12, wherein the laser source comprises one or more laser diode bars operating at a wavelength of approximately 2.1 µm.

21. The method of claim 12, wherein each optical fiber comprises $ZrF_4$—$BaF_2$—$LaF_3$—$AlF_3$—$NaF$ (ZBLAN).

* * * * *

UNITED STATES PATENT AND TRADEMARK OFFICE
CERTIFICATE OF CORRECTION

PATENT NO. : 11,656,420 B2
APPLICATION NO. : 17/581894
DATED : May 23, 2023
INVENTOR(S) : Edward McKenna et al.

It is certified that error appears in the above-identified patent and that said Letters Patent is hereby corrected as shown below:

In the Specification

Column 9, Line 7, "(Tg)" should be change to -- ($T_g$) --.

Column 9, Line 12, "(Ta)" should be changed to -- ($T_a$) --.

Column 17, Line 57, ""the processor 618)" should be changed to -- "the processor 618") --.

Column 21, Line 54, "9.8 m/s')" should be changed to -- 9.8 m/s$^2$) --.

Signed and Sealed this
Tenth Day of June, 2025

Coke Morgan Stewart
*Acting Director of the United States Patent and Trademark Office*